United States Patent
Suzuki et al.

(10) Patent No.: US 10,039,091 B2
(45) Date of Patent: Jul. 31, 2018

(54) BASE STATION DEVICE, MOBILE STATION DEVICE, WIRELESS COMMUNICATION METHOD, WIRELESS COMMUNICATION SYSTEM, AND INTEGRATED CIRCUIT

(71) Applicant: Sharp Kabushiki Kaisha, Sakai, Osaka (JP)

(72) Inventors: Shoichi Suzuki, Sakai (JP); Tatsushi Aiba, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/443,032

(22) Filed: Feb. 27, 2017

(65) Prior Publication Data

US 2017/0171844 A1 Jun. 15, 2017

Related U.S. Application Data

(63) Continuation of application No. 14/354,686, filed as application No. PCT/JP2012/073451 on Sep. 13, 2012, now abandoned.

(30) Foreign Application Priority Data

Nov. 2, 2011 (JP) ................................. 2011-241104

(51) Int. Cl.
*H04W 4/00* (2018.01)
*H04W 72/04* (2009.01)
*H04L 5/00* (2006.01)
*H04W 48/12* (2009.01)

(52) U.S. Cl.
CPC ......... *H04W 72/042* (2013.01); *H04L 5/0007* (2013.01); *H04W 48/12* (2013.01); *H04W 72/0413* (2013.01); *H04W 72/0446* (2013.01)

(58) Field of Classification Search
CPC .................................................... H04W 72/042
See application file for complete search history.

(56) References Cited

U.S. PATENT DOCUMENTS

2010/0227569 A1* 9/2010 Bala ...................... H04L 5/0007
455/73
2010/0279628 A1* 11/2010 Love ..................... H04L 5/0091
455/70

OTHER PUBLICATIONS

Suzuki et al., "Base Station Device, Mobile Station Device, Wireless Communication Method, Wireless Communication System, and Integrated Circuit", U.S. Appl. No. 14/354,686, filed Apr. 28, 2014.

* cited by examiner

Primary Examiner — Samina Choudhry
(74) Attorney, Agent, or Firm — Keating & Bennett, LLP

(57) ABSTRACT

A base station device that communicates with a mobile station device is provided. The base station device uses a physical broadcast channel to transmit information instructing the mobile station device to monitor a common search space or an enhanced common search space for a physical downlink channel.

6 Claims, 17 Drawing Sheets

BASE STATION DEVICE, MOBILE STATION DEVICE, WIRELESS COMMUNICATION METHOD, WIRELESS COMMUNICATION SYSTEM, AND INTEGRATED CIRCUIT

TECHNICAL FIELD

The present invention relates to a base station device, a mobile station device, a wireless communication method, a wireless communication system, and an integrated circuit.

BACKGROUND ART

Advances in wireless access schemes and wireless networks for cellular mobile communication (hereinafter designated "Long Term Evolution (LTE)" or "Evolved Universal Terrestrial Radio Access (EUTRA)") are being investigated in the 3rd Generation Partnership Project (3GPP). With LTE, an orthogonal frequency-division multiplexing (OFDM) scheme is used as the communication scheme for the downlink from a base station device to a mobile station device. Also, a single-carrier frequency-division multiple access (SC-FDMA) scheme is used as the communication scheme for the uplink from a mobile station device to a base station device. Herein, in LTE, a base station device is also designated Evolved Node B (eNodeB), and a mobile station device is also designated User Equipment (UE). LTE is a cellular communication system that plurally arranges areas covered by base station devices into cells.

In LTE, a base station device uses 72 subcarriers in the center of a cell to transmit a synchronization signal (SS) and a physical broadcast channel (PBCH). In LTE, a mobile station device conducts a cell search using a synchronization signal, and acquires time timings, frequency timings, and a physical layer cell identity (PCI). In LTE, after a cell search, the mobile station device uses the physical broadcast channel to acquire a master information block. The master information block is system information. In addition, the master information block includes information indicating the downlink bandwidth of the cell as well as information indicating a system frame number (SFN), and the like. A system frame is also designated a radio frame.

In LTE, after receiving the PBCH, a mobile station device uses a physical downlink shared channel (PDSCH) to acquire multiple system information blocks. The system information blocks are system information. In addition, the system information blocks include radio resource configuration information that is common for multiple mobile station devices. A base station device transmits a single system information block using a single PDCCH.

In LTE, a base station device assigns a portion of the downlink band of a cell to the PDSCH. Also, in LTE, a base station device transmits downlink control information (DCI) used to schedule a single PDSCH using a single physical downlink control channel (PDCCH). Also, in LTE, a base station device transmits downlink control information used to schedule a PDSCH that transmits a system information block with a PDCCH in a common search space. The common search space is used for PDCCH transmission which common for all mobile station devices. In LTE, all mobile station devices monitor the common search space for a PDCCH.

In LTE, a mobile station device configures a physical random access channel (PRACH) on the basis of radio resource configuration information included in system information blocks. In LTE, after configuring the PRACH, a mobile station device starts a random access procedure, and adjusts the uplink transmission timings. In LTE, after adjusting the uplink transmission timings, a mobile station device transmits a connection request message to a base station device, and starts an initial connection establishment.

In LTE, a technology is used in which a mobile station device and a base station device communicate by using multiple cells (component carriers) with the same channel structure (cell aggregation, also designated carrier aggregation). For example, with communication using cell aggregation, a mobile station device and a base station device are able to use multiple cells to transmit and receive on multiple physical channels at the same time. For example, after a mobile station device and a base station device conduct initial connection establishment in one cell, the base station device is able to add cells to be used for communication with that mobile station device.

In 3GPP, in order to improve spectral efficiency, the introduction of non-backward compatible component carriers is being investigated. On a non-backward compatible component carrier, at least one of the synchronization signal, PBCH, PDCCH, and system information block is not transmitted (NPL 1). Consequently, a mobile station device and a base station device are required to conduct initial connection establishment on one backward compatible component carrier, and afterwards add a non-backward compatible component carrier to be used for communication between the base station device and the mobile station device. In other words, a non-backward compatible component carrier is required to be part of a component carrier set that includes at least one backward compatible component carrier. Backward compatible component carriers are the component carriers that have been used in LTE heretofore.

In addition, in 3GPP, the use of an enhanced physical downlink control channel (E-PDCCH) to transmit downlink control information is being investigated in order to increase the number of terminals that a single base station is able to serve. The E-PDCCH is mapped to the PDSCH space. Additionally, in 3GPP, the introduction of technologies such as beamforming and spatial multiplexing with respect to the E-PDCCH are being investigated.

CITATION LIST

Non Patent Literature

NPL 1: "Additional Carrier Type for Rel-11", R1-113186, 3GPP TSG-RAN WG1 Meeting #66bis, Zhuhai, China, 10-14 Oct. 2011

NPL 2: "Enhancements for UE specific control signaling", R1-111332, 3GPP TSG-RAN WG1 Meeting #65, Barcelona, Spain, 9-13 May 2011

SUMMARY OF INVENTION

Technical Problem

Henceforth, many non-backward compatible component carriers need to be introduced in order to improve spectral efficiency. However, with the technology of the related art, a mobile station device and a base station device are required to conduct initial connection establishment (initial access) on one backward compatible component carrier, and afterwards add a non-backward compatible component carrier to be used for communication between the base station device and the mobile station device. In other words, with the technology of the related art, there is a problem in that a mobile station device is unable to conduct initial connection establishment on a non-backward compatible component carrier.

The present invention has been devised in light of the above points, and an object thereof is to provide a base station device, a mobile station device a wireless communication method, a wireless communication system, and an integrated circuit that enables a mobile station device to efficiently conduct initial connection establishment (initial access).

Solution to Problem (1) According to an aspect of the present invention, a base station device that communicates with a mobile station device is provided. The base station device uses a physical broadcast channel to transmit information instructing the mobile station device to monitor a common search space or an enhanced common search space for a physical downlink channel.

(2) Preferably, the above base station device transmits the physical broadcast channel with 0th to 3rd OFDM symbols in a second slot of a 0th subframe in respective radio frames in the time domain, and with the central 72 downlink subcarriers of a cell in the frequency domain.

(3) Preferably, the above base station device transmits a physical downlink control channel in the common search space, and transmits an enhanced physical downlink control channel in the enhanced common search space. The physical downlink control channel is time-multiplexed with a physical downlink shared channel, and the enhanced physical downlink control channel is frequency-multiplexed with the physical downlink shared channel.

(4) Preferably, in a case in which the physical downlink control channel is not placed in the cell used to communicate with the mobile station device, the above base station device instructs the mobile station device to monitor the enhanced common search space for the enhanced physical downlink control channel with the information.

(5) Preferably, in a case in which the physical downlink control channel and the enhanced physical downlink control channel are placed in the cell used to communicate with the mobile station device, the base station device instructs the mobile station device to monitor the common search space for the physical downlink control channel with the information.

(6) According to another aspect of the present invention, a base station device that communicates with a mobile station device is provided. The base station device uses a physical downlink shared channel to transmit a system information block which is common for a plurality of the mobile station device and which includes information related to configuration of an enhanced mobile station device-specific search space.

(7) Preferably, the above base station device uses the physical downlink shared channel to transmit dedicated radio resource control information for the mobile station device, including information related to configuration of the enhanced mobile station device-specific search space.

(8) Preferably, until transmitting the dedicated radio resource control information to the mobile station device, the base station device, on the basis of information related to configuration of the enhanced mobile station device-specific search space included in the system information block, transmits an enhanced physical downlink control channel targeting the mobile station device in the enhanced mobile station device-specific search space configured by the mobile station device.

(9) According to another aspect of the present invention, a base station device that communicates with a mobile station device is provided. The base station places downlink control information in one or a plurality of contiguous enhanced control channel elements, places the enhanced control channel elements in a plurality of virtual resource blocks so that a plurality of the enhanced control elements are placed in a single virtual resource block, places the virtual resource blocks with numbers that are consecutive in a first slot into physical resource blocks with numbers that are distributed in a first slot, places the virtual resource blocks with numbers that are consecutive in a second slot into physical resource blocks with numbers that are distributed in a second slot, and places a virtual resource block in the first slot and a virtual resource block in the second slot with the same number into the physical resource blocks with numbers that are distributed.

(10) Preferably, the above base station device interleaves a plurality of the enhanced control channel elements placed in a virtual resource block in the first slot and a virtual resource block in the second slot with the same number before placement in the physical resource blocks, in units that are smaller than the enhanced control channel elements.

(11) According to another aspect of the present invention, a mobile station device that communicates with a base station device is provided. The mobile station device uses a physical broadcast channel to receive information instructing the mobile station device to monitor a common search space or an enhanced common search space for a physical downlink channel, and on the basis of the information, monitors the common search space or the enhanced common search space for the physical downlink channel.

(12) Preferably, in the above mobile station device, the physical broadcast channel is transmitted with 0th to 3rd OFDM symbols in a second slot of a 0th subframe in respective radio frames in the time domain, and with the central 72 downlink subcarriers of a cell in the frequency domain.

(13) Preferably, the mobile station device receives a physical downlink control channel in the common search space, and receives an enhanced physical downlink control channel in the enhanced common search space. The physical downlink control channel is time-multiplexed with a physical downlink shared channel, and the enhanced physical downlink control channel is frequency-multiplexed with the physical downlink shared channel.

(14) According to another aspect of the present invention, a mobile station device that communicates with a base station device is provided. The mobile station device uses a physical downlink shared channel to receive a system information block common for a plurality of the mobile station device, and the system information block includes information related to configuration of an enhanced mobile station device-specific search space.

(15) Preferably, the above mobile station device uses the physical downlink shared channel to receive dedicated radio resource control information for the mobile station device, and the dedicated radio resource control information includes information related to configuration of the enhanced mobile station device-specific search space.

(16) Preferably, until receiving the dedicated radio resource control information from the base station device, the mobile station device monitors the enhanced mobile station device-specific search space configured on the basis of information related to configuration of the enhanced mobile station device-specific search space included in the system information block for an enhanced physical downlink control channel targeting the device itself.

(17) Preferably, in a case in which the enhanced mobile station device-specific search space is configured on the basis of information related to configuration of the enhanced mobile station device-specific search space included in the dedicated radio resource control information, the above mobile station device the mobile station device does not configure the enhanced mobile station device-specific search space on the basis of information related to configuration of the enhanced mobile station device-specific search space included in a subsequently received system information block.

(18) According to another aspect of the present invention, a mobile station device that communicates with a base station device is provided. The mobile station device receives downlink control information from the base station device. The downlink control information is placed in one or a plurality of contiguous enhanced control channel elements, the enhanced control channel elements are placed in a plurality of virtual resource blocks so that a plurality of the enhanced control elements are placed in a single virtual resource block, the virtual resource blocks with numbers that are consecutive in a first slot are placed into physical resource blocks with numbers that are distributed in a first slot, the virtual resource blocks with numbers that are consecutive in a second slot are placed into physical resource blocks with numbers that are distributed in a second slot, and a virtual resource block in the first slot and a virtual resource block in the second slot with the same number are placed into the physical resource blocks with numbers that are distributed.

(19) Preferably, in the above mobile station device, a plurality of the enhanced control channel elements placed in a virtual resource block in a first slot and a virtual resource block in a second slot with the same number are interleaved before placement in the physical resource blocks, in units that are smaller than the control channel elements.

(20) According to another aspect of the present invention, a wireless communication method used by a base station device that communicates with a mobile station device is provided. The wireless communication method uses a physical broadcast channel to transmit information instructing the mobile station device to monitor a common search space or an enhanced common search space for a physical downlink channel.

(21) According to another aspect of the present invention, a wireless communication method used by a base station device that communicates with a mobile station device is provided. The wireless communication method uses a physical downlink shared channel to transmit a system information block which is common for a plurality of the mobile station device and which includes information related to configuration of an enhanced mobile station device-specific search space.

(22) According to another aspect of the present invention, a wireless communication method used by a base station device that communicates with a mobile station device is provided. The wireless communication method places downlink control information in one or a plurality of contiguous enhanced control channel elements, places the enhanced control channel elements in a plurality of virtual resource blocks so that a plurality of the enhanced control elements are placed in a single virtual resource block, places the virtual resource blocks with numbers that are consecutive in a first slot into physical resource blocks with numbers that are distributed in a first slot, places the virtual resource blocks with numbers that are consecutive in a second slot into physical resource blocks with numbers that are distributed in a second slot, and places a virtual resource block in the first slot and a virtual resource block in the second slot with the same number into the physical resource blocks with numbers that are distributed.

(23) According to another aspect of the present invention, a wireless communication method used by a mobile station device that communicates with a base station device is provided. The wireless communication method uses a physical broadcast channel to transmit information instructing the mobile station device to monitor a common search space or an enhanced common search space for a physical downlink channel, and on the basis of the information, monitors the common search space or the enhanced common search space for the physical downlink channel.

(24) According to another aspect of the present invention, a wireless communication method used by a mobile station device that communicates with a base station device is provided. The wireless communication method uses a physical downlink shared channel to receive a system information block common for a plurality of the mobile station device, and the system information block includes information related to configuration of an enhanced mobile station device-specific search space.

(25) According to another aspect of the present invention, a wireless communication method used by a mobile station device that communicates with a base station device is provided. The wireless communication method receives downlink control information from the base station device, the downlink control information is placed in one or a plurality of contiguous enhanced control channel elements, the enhanced control channel elements are placed in a plurality of virtual resource blocks so that a plurality of the enhanced control elements are placed in a single virtual resource block, the virtual resource blocks with numbers that are consecutive in a first slot are placed into physical resource blocks with numbers that are distributed in a first slot, the virtual resource blocks with numbers that are consecutive in a second slot are placed into physical resource blocks with numbers that are distributed in a second slot, and a virtual resource block in the first slot and a virtual resource block in the second slot with the same number are placed into the physical resource blocks with numbers that are distributed.

(26) According to another aspect of the present invention, a wireless communication system in which a mobile station device and a base station device communicate is provided. In the wireless communication system, the base station device uses a physical broadcast channel to transmit information instructing the mobile station device to monitor a common search space or an enhanced common search space for a physical downlink channel. On the basis of the information, the mobile station device monitors the common search space or the enhanced common search space for the physical downlink channel.

(27) According to another aspect of the present invention, a wireless communication system in which a mobile station device and a base station device communicate is provided. In the wireless communication system, the base station device uses a physical downlink shared channel to transmit a system information block which is common for a plurality of the mobile station device and which includes information related to configuration of an enhanced mobile station device-specific search space. The mobile station device configures the enhanced mobile station device-specific search space on the basis of the information.

(28) According to another aspect of the present invention, a wireless communication system in which a mobile station device and a base station device communicate is provided. In the wireless communication system, the base station device places downlink control information in one or a plurality of contiguous enhanced control channel elements, places the enhanced control channel elements in a plurality of virtual resource blocks so that a plurality of the enhanced control elements are placed in a single virtual resource block, places the virtual resource blocks with numbers that are consecutive in a first slot into physical resource blocks with numbers that are distributed in a first slot, places the virtual resource blocks with numbers that are consecutive in a second slot into physical resource blocks with numbers that are distributed in a second slot, places a virtual resource block in the first slot and a virtual resource block in the second slot with the same number into the physical resource blocks with numbers that are distributed, and transmits a signal placed in the physical resource blocks to the mobile station device. The mobile station device receives the signal placed in the physical resource blocks, and conducts a process of decoding the downlink control information on the received signal.

(29) According to another aspect of the present invention, an integrated circuit used by a base station device that communicates with a mobile station device is provided. The integrated circuit uses a physical broadcast channel to transmit information instructing the mobile station device to monitor a common search space or an enhanced common search space for a physical downlink channel.

(30) According to another aspect of the present invention, an integrated circuit used by a base station device that communicates with a mobile station device is provided. The integrated circuit uses a physical downlink shared channel to transmit a system information block which is common for a plurality of the mobile station device and which includes information related to configuration of an enhanced mobile station device-specific search space.

(31) According to another aspect of the present invention, an integrated circuit used by a base station device that communicates with a mobile station device is provided. The integrated circuit places downlink control information in one or a plurality of contiguous enhanced control channel elements, places the enhanced control channel elements in a plurality of virtual resource blocks so that a plurality of the enhanced control elements are placed in a single virtual resource block, places the virtual resource blocks with numbers that are consecutive in a first slot into physical resource blocks with numbers that are distributed in a first slot, places the virtual resource blocks with numbers that are consecutive in a second slot into physical resource blocks with numbers that are distributed in a second slot, and places a virtual resource block in the first slot and a virtual resource block in the second slot with the same number into the physical resource blocks with numbers that are distributed.

(32) According to another aspect of the present invention, an integrated circuit used by a mobile station device that communicates with a base station device is provided. The integrated circuit uses a physical broadcast channel to receive information instructing the mobile station device to monitor a common search space or an enhanced common search space for a physical downlink channel, and on the basis of the information, monitors the common search space or the enhanced common search space for the physical downlink channel.

(33) According to another aspect of the present invention, an integrated circuit used by a mobile station device that communicates with a base station device is provided. The integrated circuit uses a physical downlink shared channel to receive a system information block common for a plurality of the mobile station device, and the system information block includes information related to configuration of an enhanced mobile station device-specific search space.

(34) According to another aspect of the present invention, an integrated circuit used by a mobile station device that communicates with a base station device is provided. The integrated circuit receives downlink control information from the base station device, the downlink control information is placed in one or a plurality of contiguous enhanced control channel elements, the enhanced control channel elements are placed in a plurality of virtual resource blocks so that a plurality of the enhanced control elements are placed in a single virtual resource block, the virtual resource blocks with numbers that are consecutive in a first slot are placed into physical resource blocks with numbers that are distributed in a first slot, the virtual resource blocks with numbers that are consecutive in a second slot are placed into physical resource blocks with numbers that are distributed in a second slot, and a virtual resource block in the first slot and a virtual resource block in the second slot with the same number are placed into the physical resource blocks with numbers that are distributed.

Advantageous Effects of Invention

According to the present invention, in a system in which both a backward compatible component carrier and a non-backward compatible component carrier coexist, a mobile station device is able to efficiently conduct initial connection establishment (initial access) on both component carriers.

DESCRIPTION OF EMBODIMENT

Hereinafter, an embodiment of the present invention will be described in detail and with reference to the drawings.

[Physical Channel]

First, a physical channel according to the present embodiment will be described.

Figure 1:
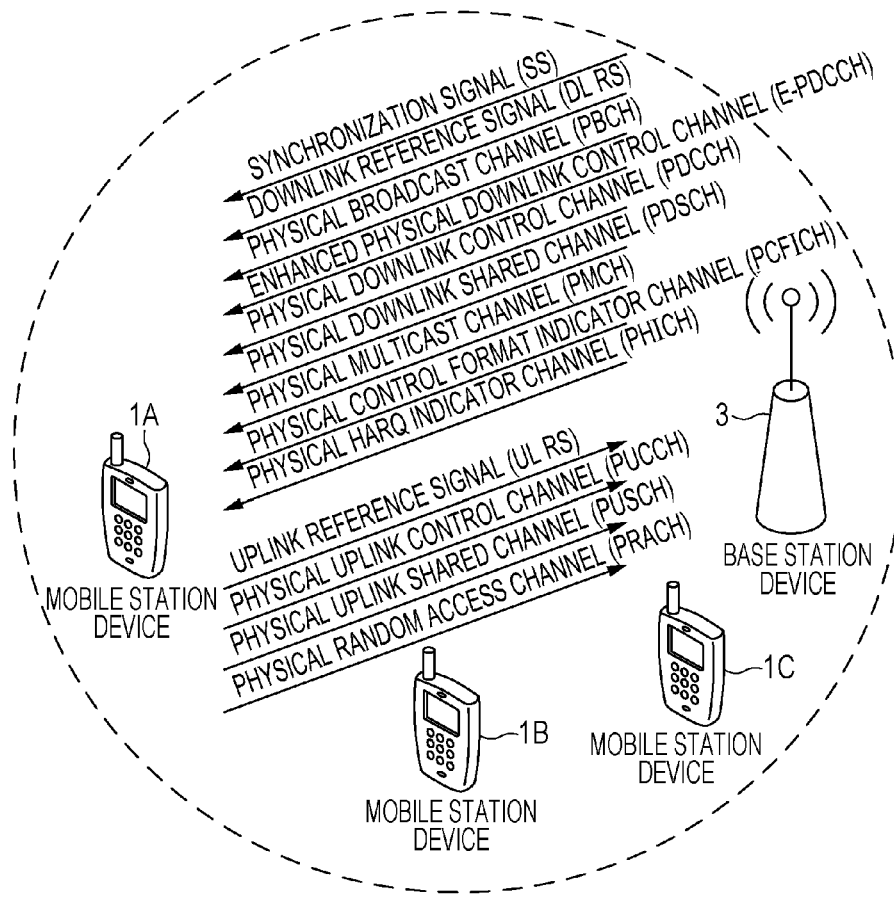
FIG. 1 is a conceptual diagram of a wireless communication system according to an embodiment.

FIG. 1 is a conceptual diagram of a wireless communication system according to the present embodiment. In FIG. 1, the wireless communication system includes mobile station devices 1A to 1C, and a base station device 3. FIG. 1 indicates that a synchronization signal (SS), a downlink reference signal (DL RS), a physical broadcast channel (PBCH), a physical downlink control channel (PDCCH), an enhanced physical downlink control channel (E-PDCCH), a physical downlink shared channel (PDSCH), a physical multicast channel (PMCH), a physical control format indicator channel (PCFICH), and a physical hybrid ARQ indicator channel (PHICH) are used for wireless communication on the downlink from the base station device 3 to the mobile station devices 1A to 1C.

In addition, FIG. 1 indicates that an uplink reference signal (UL RS), a physical uplink control channel (PUCCH), a physical uplink shared channel (PUSCH), and a physical random access channel (PRACH) are used for wireless communication on the uplink from the mobile station devices 1A to 1C to the base station device 3. Hereinafter, the mobile station devices 1A to 1C may also be designated the mobile station device 1.

The synchronization signal is used by the mobile station device 1 to synchronize the frequency domain and the time domain of the downlink. The downlink reference signal is used by the mobile station device 1 to synchronize the frequency domain and the time domain of the downlink, is used by the mobile station device 1 to measure the reception quality of the downlink, and is used by the mobile station device 1 to compensate the channels of the PDSCH and the PDCCH. The PBCH is a physical channel used to broadcast system information (master information block, broadcast channel (BCH)) used in common by the mobile station devices 1. The PBCH is transmitted at a 40 ms interval. The timing of the 40 ms interval is detected by blind detection in the mobile station device 1. Also, the PBCH is retransmitted at a 10 ms interval.

The PDCCH and the E-PDCCH are physical channels used to transmit downlink control information (DCI) such as a downlink assignment (also designated a downlink grant) or an uplink grant. A downlink assignment is made up of information related to the modulation and coding scheme (MCS) for the PDSCH, information indicating radio resource allocation, a transmission power control (TPC) command for the PUCCH, and the like. An uplink grant is made up of information related to the modulation and coding scheme for the PUSCH, information indicating radio resource allocation, a TPC command for the PUSCH, and the like.

Multiple formats are used in the downlink control information. The format of the downlink control information is called the DCI format. For example, DCI Format 0 is used for scheduling of the PUSCH with a single-antenna port transmission scheme within a single cell. DCI Format 4 is used for scheduling of the PUSCH with a multi-antenna port transmission scheme within a single cell. DCI Format 1A is used for scheduling of the PDSCH with a single-antenna port transmission scheme or a transmission diversity scheme within a single cell. DCI Format 2 is used for scheduling of the PDSCH with a multi-antenna port transmission scheme within a single cell. DCI Format 0 and DCI Format 4 are uplink grants. DCI Format 1A and DCI Format 2 are downlink assignments.

The PDSCH is a physical channel used to transmit paging information (paging channel (PCH)), system information, and downlink data (downlink shared channel (DL-SCH)). System information transmitted by PDSCH is designated a system information block. In addition, a system information block includes radio resource configuration information common for multiple mobile station devices. The PMCH is a physical channel used to transmit information (multicast channel (MCH)) related to the Multimedia Broadcast and Multicast Service (MBMS). The PCFICH is a physical channel used to transmit information indicating the domain (OFDM symbols) in which the PDCCH is placed. The PHICH is a physical channel used to transmit a HARQ indicator (acknowledgement information) that indicates whether or not uplink data received by the base station device 3 was successfully decoded.

In the case in which the base station device 3 successfully decodes uplink data included in the PUSCH, the HARQ indicator for that uplink data indicates an acknowledgement (ACK), whereas in the case in which the base station device 3 fails to decode uplink data included in the PUSCH, the HARQ indicator indicates a negative acknowledgement (NACK). A single PHICH transmits a HARQ indicator for a single piece of uplink data. HARQ indicators for multiple pieces of uplink data included in the same PUSCH are transmitted using multiple PHICHs.

The uplink reference signal is a signal that is used by the base station device 3 to synchronize the time domain of the uplink, used by the base station device 3 to measure the reception quality of the uplink, and used by the base station device 3 to compensate the channels of the PUSCH and the PUCCH. The uplink reference signal may be a demodulation reference signal (DMRS) that is time-multiplexed with the PUSCH or PUCCH and transmitted, or a sounding reference signal (SRS) that is transmitted irrespectively of the PUSCH and PUCCH.

The PUCCH is a physical channel used to transmit uplink control information (UCI), which is information used to control communication, such as channel state information (CSI) indicating the channel quality of the downlink, a scheduling request (SR) indicating a PUSCH radio resource request, and an ACK/NACK indicating whether or not downlink data received by the mobile station device 1 was successfully decoded.

The PUSCH is a physical channel used to transmit uplink data (uplink shared channel (UL-SCH)) and uplink control information. The PRACH is a physical channel used to transmit a random access preamble. The PRACH's primary purpose is for the mobile station device 1 to synchronize the time domain with the base station device 3, but the PRACH is otherwise used for the initial connection establishment procedure, the handover procedure, the connection re-establishment procedure, for synchronization of uplink transmission (timing adjustment), and for uplink radio resource allocation.

The BCH, UL-SCH, DL-SCH, and the like are transport channels. The units by which the UL-SCH is transmitted by the PUSCH, as well as the units by which the DL-SCH is transmitted by the PDSCH, are called transport blocks (TBs). A transport block is a unit of data that the Media Access Control (MAC) layer delivers to the physical layer. In the MAC layer, HARQ (retransmission) control is conducted for each transport block. Additionally, the units of data by which the UL-SCH, DL-SCH, and the like are handled in the MAC layer are also called MAC protocol data units (PDUs). In the physical layer, transport blocks are mapped to code words, and a coding process is conducted on each code word.

[Cell Aggregation (Carrier Aggregation)]

Hereinafter, cell aggregation (carrier aggregation) according to the present embodiment will be described.

With cell aggregation, multiple serving cells are aggregated. For example, in a cell aggregation process, three serving cells (serving cell 1, serving cell 2, serving cell 3) are aggregated. One serving cell from among the aggregated multiple serving cells is the primary cell (Pcell).

The primary cell is the cell in which the mobile station device 1 conducted an initial connection establishment procedure, the cell in which the mobile station device 1 started a connection re-establishment procedure, or the cell that was specified as the primary cell in a handover procedure.

The serving cells excluding the primary cell are secondary cells (Scells). Secondary cells are used to provide additional radio resources. Secondary cells are primarily used for PDSCH, PUSCH, PRACH transmission and reception. Secondary cells operate on a different frequency than the primary cell, and are added by the base station device 3 after establishing a connection between the mobile station device 1 and the base station device 3. In addition, secondary cells are reported to the mobile station device 1 from the base station device 3 during a handover procedures. The mobile station device 1 conducts PUCCH transmission in the primary cell only, and does not conduct PUCCH transmission in the secondary cells. The mobile station device 1 may also not receive paging and system information transmitted by the PBCH and PDSCH of a secondary cell.

The carrier corresponding to a serving cell on the downlink is the downlink component carrier (DL CC), while the carrier corresponding to a serving cell on the uplink is the uplink component carrier (UL CC). The carrier corresponding to the primary cell on the downlink is the downlink primary component carrier (DL PCC), while the carrier corresponding to the primary cell on the uplink is the uplink primary component carrier (UL PCC). The carrier corresponding to a secondary cell on the downlink is the downlink secondary component carrier (DL SCC), while the carrier corresponding to a secondary cell on the uplink is the uplink secondary component carrier (UL SCC).

A downlink component carrier may be a backward compatible component carrier, or a non-backward compatible component carrier. In the present embodiment, backward compatible component carriers are the downlink component carriers on which all of the physical downlink channels discussed above are transmitted. In the present embodiment, non-backward compatible component carriers are the downlink component carriers on which the PCFICH, PHICH, and PDCCH are not transmitted. While the base station device 3 and the mobile station device 1 are communicating using a component carrier, that component carrier's type cannot be changed.

Each physical channel is transmitted in one of the serving cells. In other words, a single physical channel is not transmitted across multiple serving cells.

[Radio Frame]

Hereinafter, a radio frame according to the present embodiment will be described.

Figure 2:
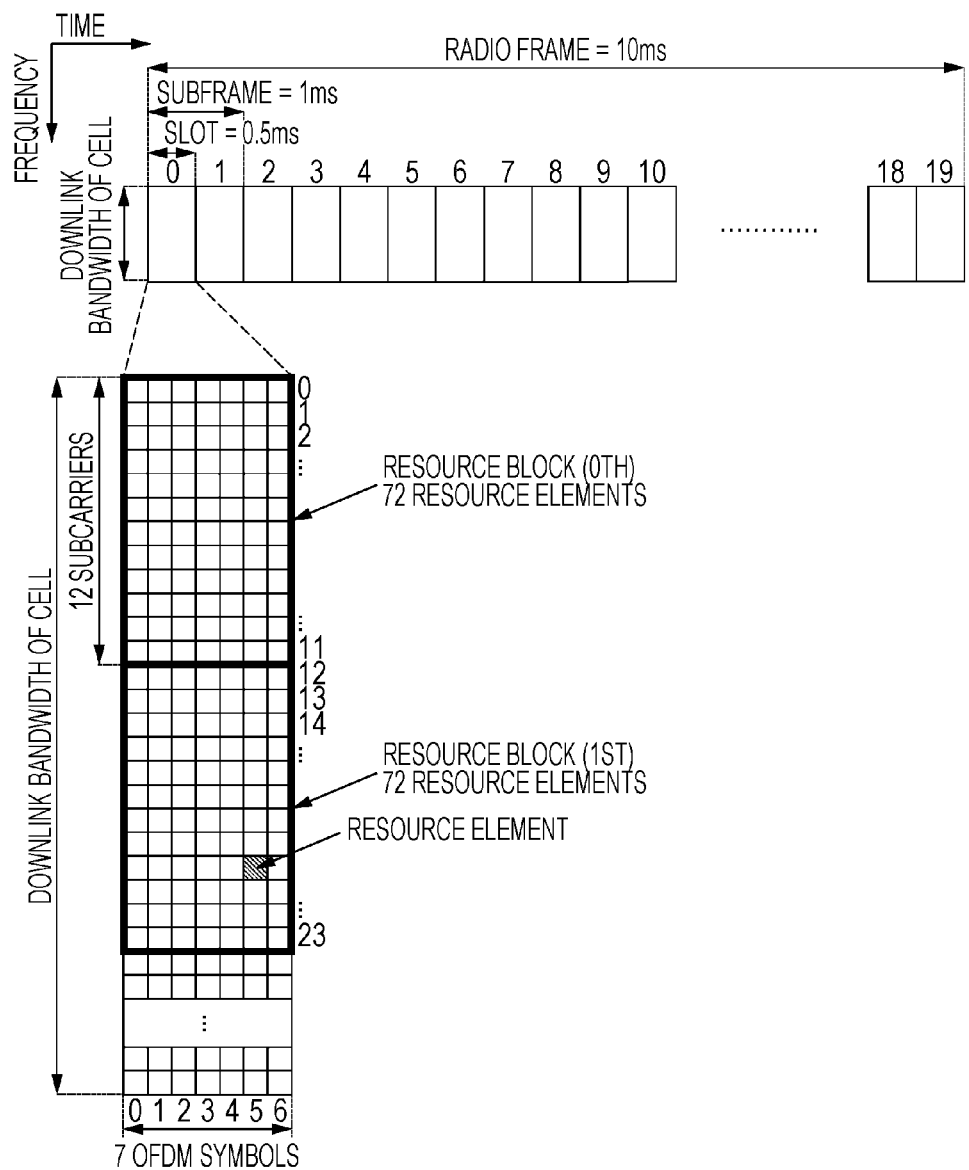
FIG. 2 is a diagram illustrating a schematic configuration of a radio frame according to the present embodiment.

FIG. 2 is a diagram illustrating a schematic configuration of a radio frame according to the present embodiment. Each radio frame has a 10 ms length. Also, each radio frame contains 20 slots. Each slot has a 0.5 ms length, and is assigned a number from 0 to 19. Each subframe has a 1 ms length, and is defined by two consecutive slots. The ith subframe within a radio frame contains the (2×i)th slot and the (2×i+1)th slot. In other words, 10 subframes may be used in each 10 ms interval.

The signal or physical channel transmitted in each slot is expressed by a resource grid. The resource grid is defined by multiple subcarriers and multiple OFDM symbols. The number of subcarriers constituting one slot depends on the downlink bandwidth of the cell. The number of OFDM symbols constituting one slot is 7. Each element within the resource grid is designated a resource element. A resource element is identified using a subcarrier number and an OFDM symbol number.

A resource block is used to express a mapping of resource elements in a given physical downlink channel (such as the PDSCH). Among resource blocks, virtual resource blocks and physical resource blocks are defined. A given physical downlink channel is first mapped to a virtual resource block. Afterwards, the virtual resource block is mapped to a physical resource block. One physical resource block is defined from 7 continuous OFDM symbols in the time domain and 12 contiguous subcarriers in the frequency domain. Consequently, one physical resource block contains (7×12) resource elements. In addition, one physical resource block corresponds to one slot in the time domain, and corresponds to 180 kHz in the frequency domain. Physical resource blocks are numbered starting from 0 in the frequency domain.

[Physical Downlink Channel Mapping]

Hereinafter, an example of physical downlink channel mapping according to the present embodiment will be described.

Figure 3:
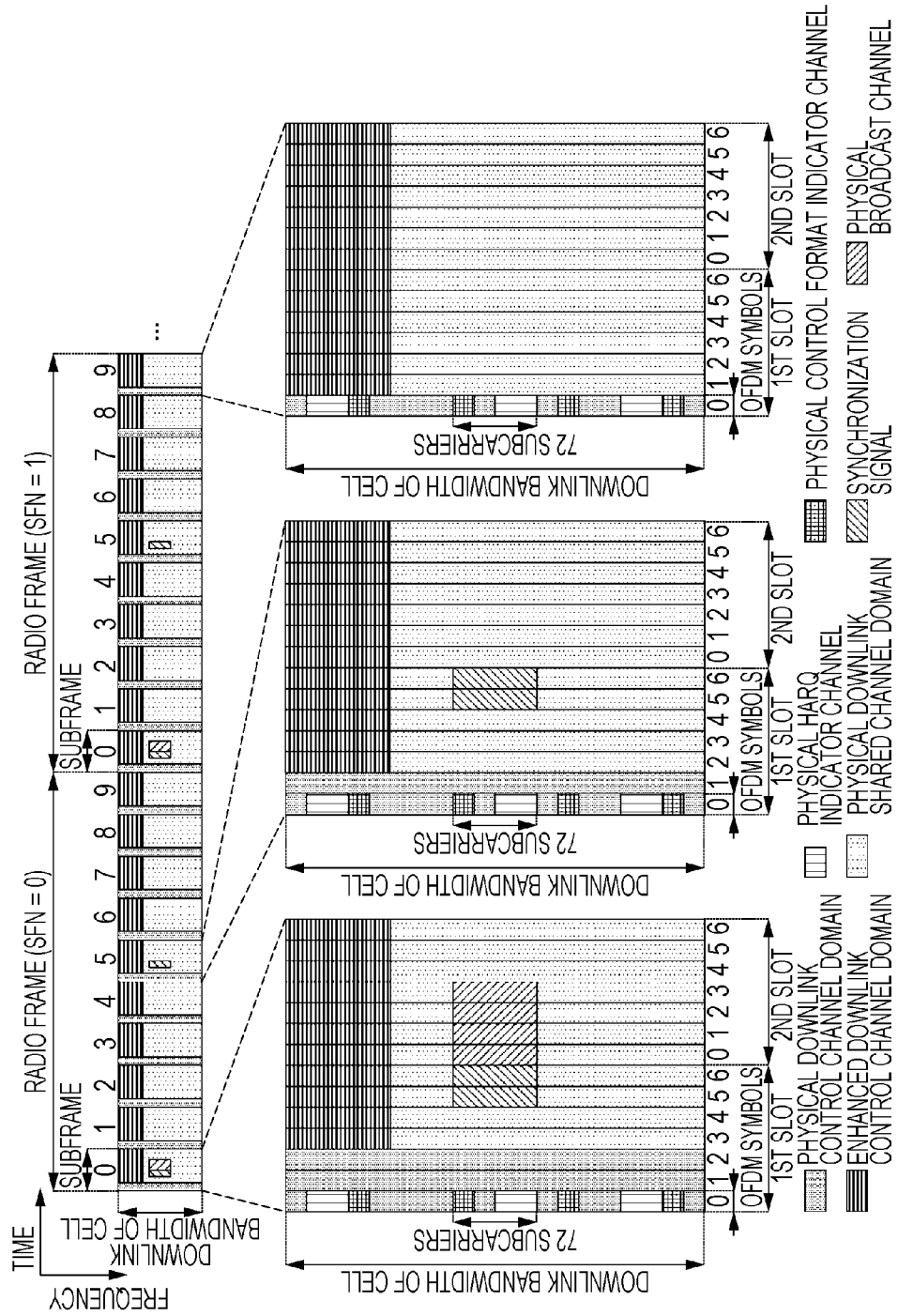
FIG. 3 is a diagram illustrating an example of physical downlink channel mapping on a backward compatible component carrier according to the present embodiment.

FIG. 3 is a diagram illustrating an example of physical downlink channel mapping on a backward compatible component carrier according to the present embodiment. The PCFICH is mapped to the 0th (initial) OFDM symbol in the subframe. Also, the PCFICH is mapped to four resource element groups distributed in the frequency domain. A resource element group is made up of multiple contiguous resource elements. The PHICH is mapped to the 0th (initial) OFDM symbol in the subframe. One PCFICH is mapped to three resource elements distributed in the frequency domain. In addition, the base station device 3 may code-multiplex multiple PCFICHs onto the same resource elements.

The PDCCH is mapped to the 0th, the 0th and 1st, or from the 0th to the 2nd OFDM symbols in the subframe. In the 0th OFDM symbol, the PDCCH is mapped so as to avoid resource elements mapped with the PCFICH and the PHICH. The mobile station device 1 recognizes the OFDM symbols mapped with the PDCCH on the basis of information received by the PCFICH. In addition, the base station device 3 may time- and frequency-multiplex multiple PDCCHs.

The PDSCH and the E-PDCCH are mapped to OFDM symbols not mapped with the PDCCH in the subframe. The base station device 3 may frequency-multiplex, time-multiplex, and/or spatially multiplex multiple PDSCHs. In addition, the base station device 3 may frequency-multiplex, time-multiplex, and/or spatially multiplex multiple E-PDCCHs. In addition, the base station device 3 frequency-multiplexes the PDSCH and the E-PDCCH.

In the time domain, the synchronization signal is transmitted in the 0th and 5th subframes in each radio frame. In those 0th and 5th subframes, the synchronization signal is transmitted with the 5th and 6th OFDM symbols in the first slot. Also, in the frequency domain, the synchronization signal is transmitted with the 72 subcarriers in the center of the downlink of the cell.

In the time domain, the PBCH is transmitted in the 0th subframe in each radio frame. In that 0th subframe, the PBCH is transmitted with the 0th to the 3rd OFDM symbols in the second slot. Also, in the frequency domain, the PBCH is transmitted with the 72 subcarriers in the center of the downlink of the cell. Note that illustration of the downlink reference signal and the PMCH is omitted from FIG. 3.

Figure 4:
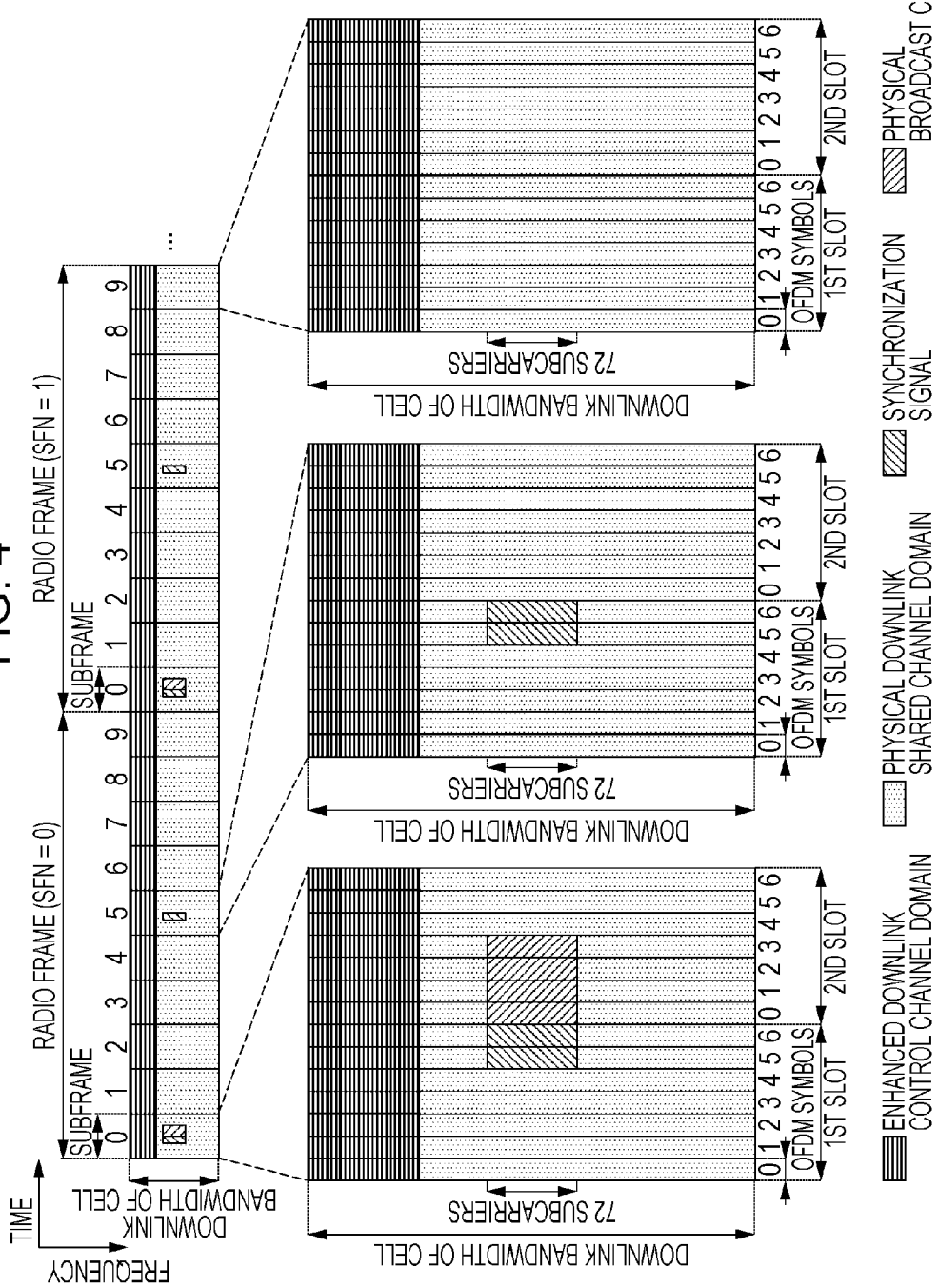
FIG. 4 is a diagram illustrating an example of physical downlink channel mapping on a non-backward compatible component carrier according to the present embodiment.

FIG. 4 is a diagram illustrating an example of physical downlink channel mapping on a non-backward compatible component carrier according to the present embodiment. The base station device does not map any of the PCFICH, the PHICH, and the PDCCH onto a non-backward compatible component carrier. Consequently, the PDSCH and the E-PDCCH may be mapped starting from the 0th OFDM symbol in each subframe. The mapping of the other physical downlink channels is the same as for a backward compatible component carrier, and thus the description will not be repeated. Note that in FIG. 4, illustration of the downlink reference signal and the PMCH is not given.

[Search Space]

Hereinafter, a search space according to the present embodiment will be described.

Figure 5:
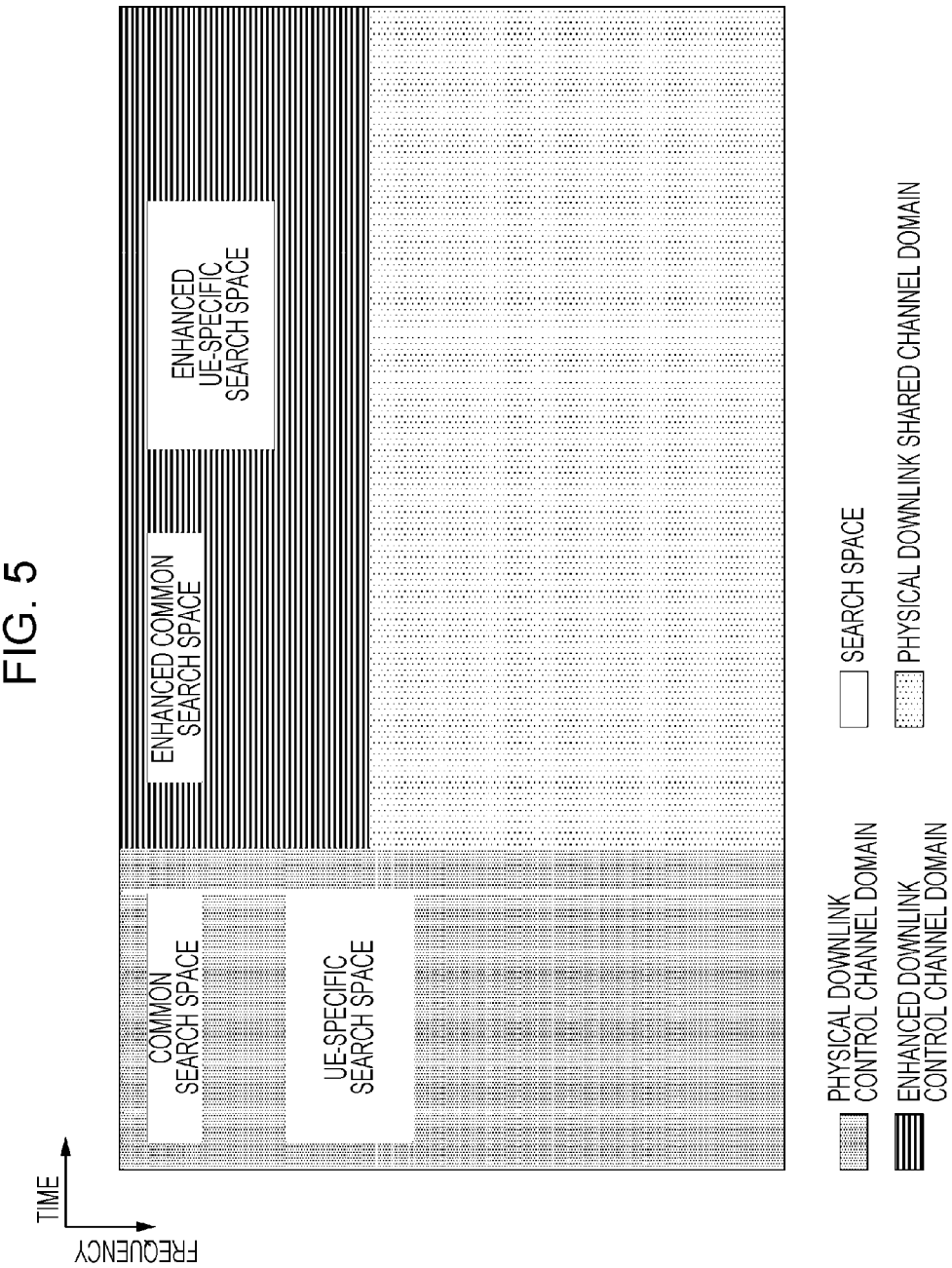
FIG. 5 is a diagram illustrating the layout of a search space according to the present embodiment.

FIG. 5 is a diagram illustrating the layout of a search space according to the present embodiment. The PDCCH domain contains a common search space (CSS) and a UE-specific search space (USS). The common search space and the UE-specific search space are sets of resources that the base station device 3 may use to transmit the PDCCH. The mobile station device 1 monitors the common search space and the UE-specific search space for the PDCCH. Since the PDCCH is not transmitted on a non-backward compatible component carrier, the common search space and the UE-specific search space do not exist in a non-backward compatible component carrier.

The E-PDCCH domain contains an enhanced common search space (E-CSS) and an enhanced UE-specific search space (E-USS). The enhanced common search space and the enhanced UE-specific search space are sets of resources that the base station device 3 may use to transmit the E-PDCCH. The mobile station device 1 monitors the enhanced common search space and the enhanced UE-specific search space for the E-PDCCH.

The common search space and the enhanced common search space are defined by resources that are common for multiple mobile station devices 1. The UE-specific search space and the enhanced UE-specific search space are independently defined for each mobile station device 1. In the common search space and the enhanced common search space, the base station device 3 transmits a DCI format targeted at multiple mobile station devices and/or a DCI format targeted at a specific mobile station device. For example, the DCI format targeted at multiple mobile station devices is a DCI format used for scheduling of system information blocks, or a DCI format used for scheduling of random access responses. In the UE-specific search space and the enhanced UE-specific search space, the base station device 3 transmits a DCI format targeted at a specific mobile station device.

Resource candidates that possibly may be used to transmit the PDCCH within the common search space and the UE-specific search space are designated PDCCH candidates. Also, PDCCH candidates are made up of multiple control channel elements (CCEs). Candidates that possibly may be used to transmit the E-PDCCH within the enhanced common search space and the enhanced UE-specific search space are designated E-PDCCH candidates. Also, E-PDCCH candidates are made up of multiple enhanced control channel elements (E-CCEs).

Figure 6:
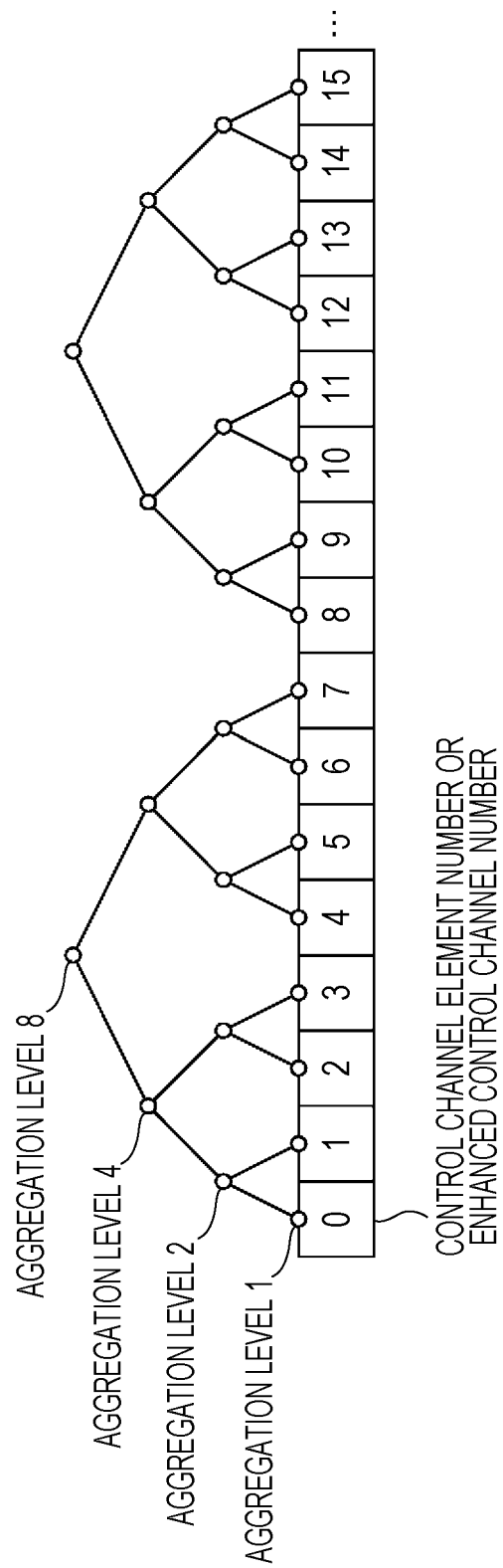
FIG. 6 is a diagram illustrating a configuration of PDCCH candidates and E-PDCCH candidates according to the present embodiment.

FIG. 6 is a diagram illustrating a configuration of PDCCH candidates and E-PDCCH candidates according to the present embodiment. A PDCCH candidate is made up of one or contiguous control channel elements. A PDCCH candidate made up of n contiguous control channel elements starts only on a control channel element having a number (index) whose remainder is 0 in the case of dividing the number (index) of the control channel element by n. A PDCCH candidate corresponding to a search space within the E-PDCCH domain is made up of one or contiguous enhanced control channel elements. A PDCCH candidate made up of n contiguous enhanced control channel elements starts only on an enhanced control channel element having a number (index) whose remainder is 0 in the case of dividing the number (index) of the enhanced control channel element by n.

In FIG. 6, the ith PDCCH candidate of aggregation level 8 is made up of the (i×8)th to the (i×8+7)th control channel elements. In FIG. 6, the ith PDCCH candidate of aggregation level 4 is made up of the (i×4)th to the (i×4+3)th control channel elements. In FIG. 6, the ith PDCCH candidate of aggregation level 2 is made up of the (i×2)th and the (i×2+1)th control channel elements. In FIG. 6, the ith PDCCH candidate of aggregation level 1 is made up of the ith control channel element.

In FIG. 6, the ith E-PDCCH candidate of aggregation level 8 is made up of the (i×8)th to the (i×8+7)th enhanced control channel elements. In FIG. 6, the ith E-PDCCH candidate of aggregation level 4 is made up of the (i×4)th to the (i×4+3)th enhanced control channel elements. In FIG. 6, the ith E-PDCCH candidate of aggregation level 2 is made up of the (i×2)th and the (i×2+1)th enhanced control channel elements. In FIG. 6, the ith E-PDCCH candidate of aggregation level 1 is made up of the ith enhanced control channel element.

The number of control channel elements constituting a PDCCH candidate, or the number of enhanced control channel elements constituting an E-PDCCH, is designated the aggregation level. The aggregation level is 1, 2, 4, or 8. A search space is defined for each aggregation level. The common search space and the enhanced common search space may take aggregation levels 4 and 8. The UE-specific search space and the enhanced UE-specific search space may take aggregation levels 1, 2, 4, and 8.

The search space of aggregation level 1 is made up of six contiguous PDCCH candidates or E-PDCCH candidates. The search space of aggregation level 2 is made up of six contiguous PDCCH candidates or E-PDCCH candidates. The search space of aggregation level 4 is made up of two contiguous PDCCH candidates or E-PDCCH candidates. The search space of aggregation level 8 is made up of two contiguous PDCCH candidates or E-PDCCH candidates.

[Common Search Space and UE-Specific Search Space]

Hereinafter, the common search space and the UE-specific search space according to the present embodiment will be described.

Figure 7:
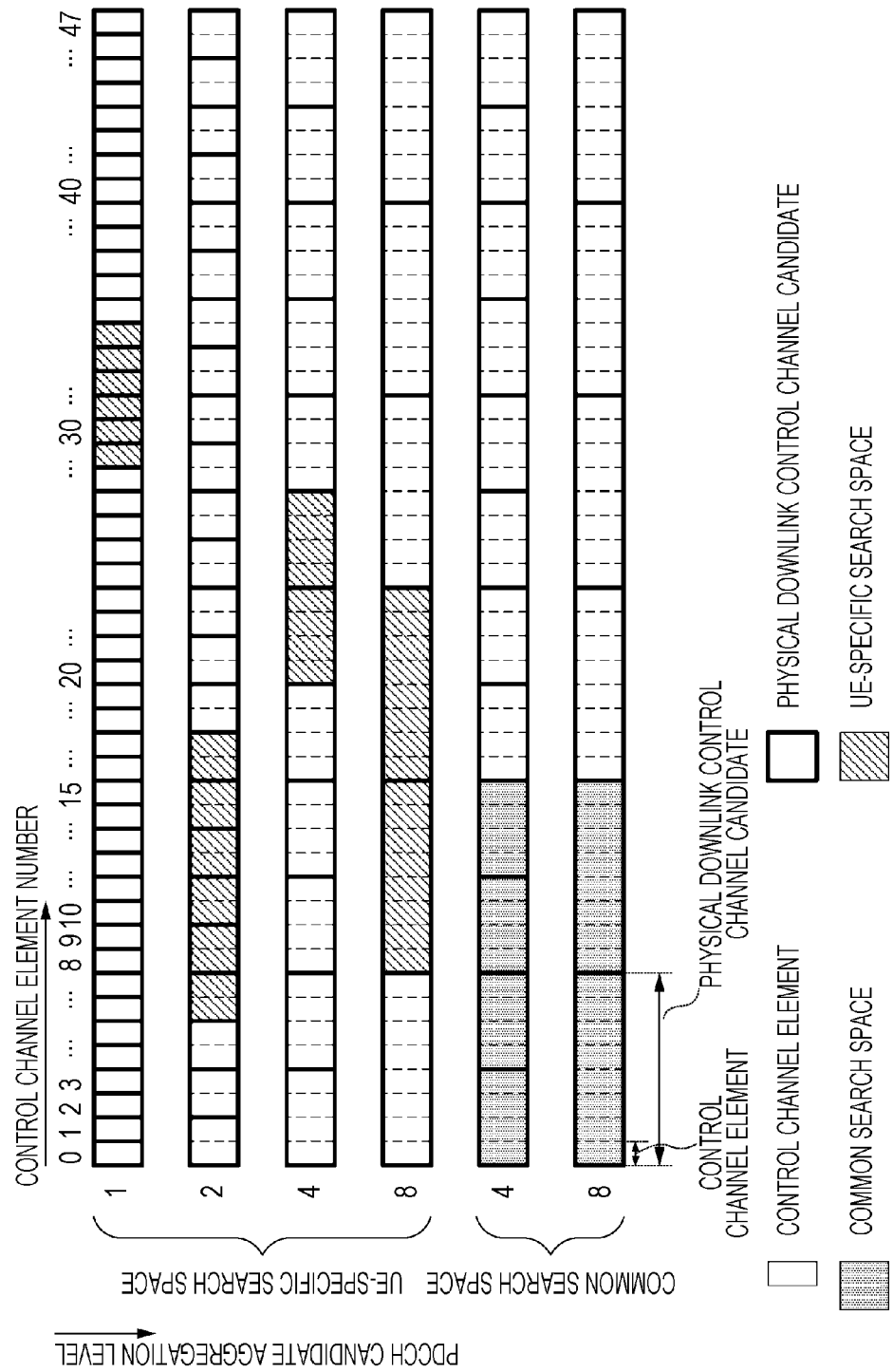
FIG. 7 is a diagram illustrating a configuration of a search space inside a PDCCH domain according to the present embodiment.

FIG. 7 is a diagram illustrating a configuration of a search space inside a PDCCH domain according to the present embodiment. The PDCCH domain contains an aggregation level 4 common search space, an aggregation level 8 common search space, an aggregation level 1 UE-specific search space, an aggregation level 2 UE-specific search space, an aggregation level 4 UE-specific search space, and an aggregation level 8 UE-specific search space.

The common search space is made up of control channel elements with predetermined numbers. In FIG. 7, the aggregation level 4 common search space and the aggregation level 8 common search space are made up of control channel elements 0 to 15. The control channel elements constituting the UE-specific search space are determined on the basis of information such as a radio network temporary identifier (RNTI) assigned to the mobile station device 1 by the base station device 3, the aggregation level, and the slot number inside the radio frame. During initial access, the base station device 3 transmits a random access response including a temporary cell-radio network temporary identifier (temporary C-RNTI) to the mobile station device 1. After initial access, the base station device 3 may also reconfigure the temporary cell-radio network temporary identifier (C-RNTI) of the mobile station device 1.

Figure 8:
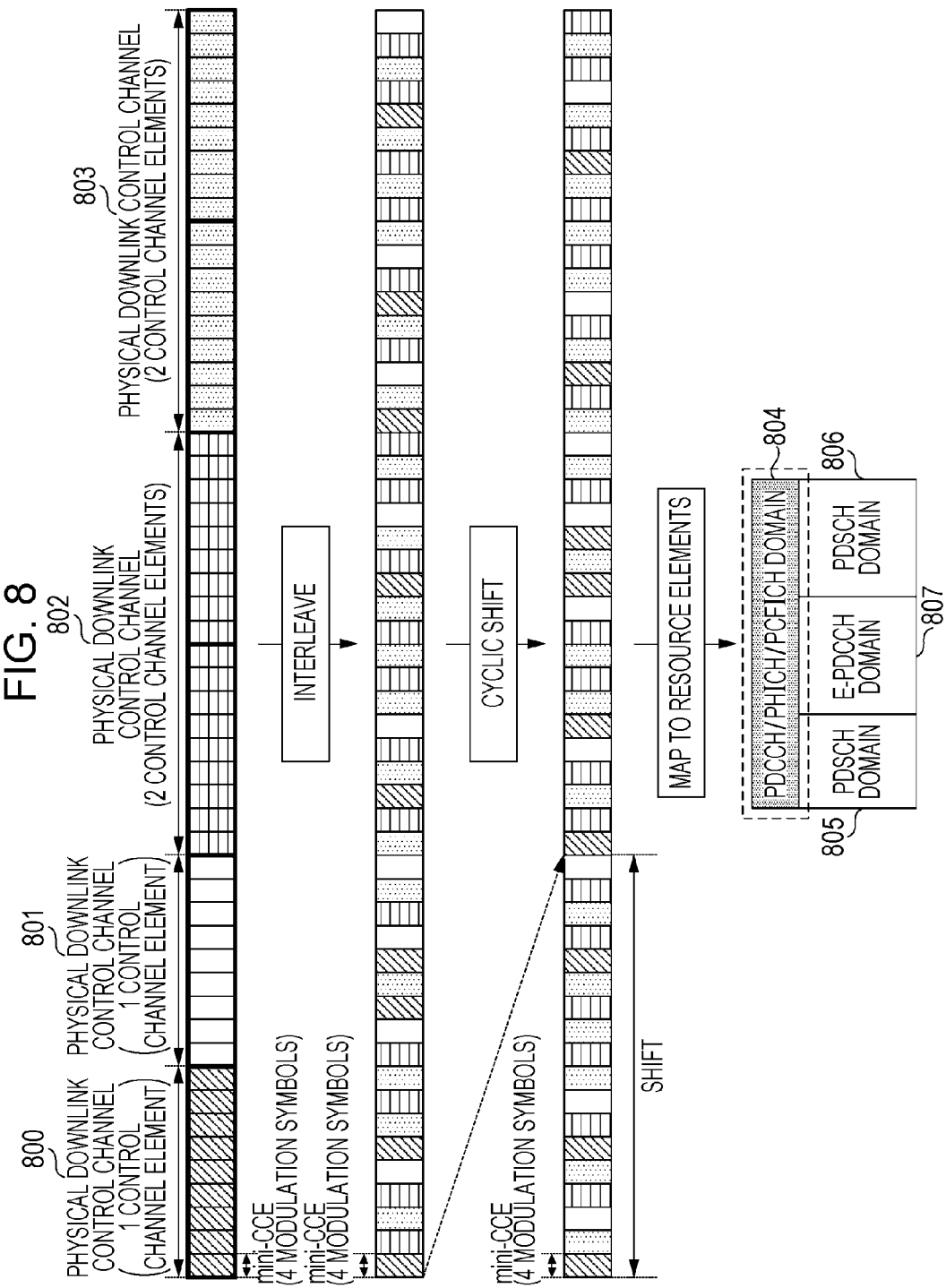
FIG. 8 is a diagram illustrating a method of mapping the PDCCH to resource elements according to the present embodiment.

FIG. 8 is a diagram illustrating a method of mapping the PDCCH to resource elements according to the present embodiment. In FIG. 8, the number 800 and the number 801 indicate PDCCHs transmitted by the base station device 3 using one control channel. In FIG. 8, the number 802 and the number 803 indicate PDCCHs transmitted by the base station device 3 using two control channels. The number 804 indicates the domain mapped with the PDCCH/PHICH/PCFICH in a subframe of a given component carrier. The number 805 and the number 806 indicate the PDSCH domain in a subframe of a given component carrier. The number 807 indicates the E-PDCCH domain in a subframe of a given component carrier.

One control channel element is used to transmit 36 modulation symbols (complex symbols). One control channel element is made up of nine mini-CCEs. One mini-CCE is made up of four modulation symbols. The base station device 3 maps one mini-CCE to one resource element group. One resource element group is made up of four contiguous resource elements. In other words, one modulation symbol is mapped to one resource element.

The base station device 3 interleaves the control channel elements from number 800 to number 803 in units of mini-CCEs. Next, the base station device 3 cyclically shifts the interleaved mini-CCEs. The base station device 3 determines the value by which to cyclically shift the mini-CCEs on the basis of the physical layer cell identity (PCI). In other words, cells having different physical layer cell identities undergo differently valued cyclic shifts. In so doing, PDCCH interference between cells may be randomized.

Next, the base station device 3 maps the cyclically shifted mini-CCEs to resource element groups of the PDCCH/PHICH/PCFICH domain 804. The base station device 3 maps the PDCCH mini-CCEs to resource element groups other than the resource element groups mapped with the PCFICH.

[Enhanced Common Search Space]

Hereinafter, the enhanced common search space according to the present embodiment will be described.

Figure 9:
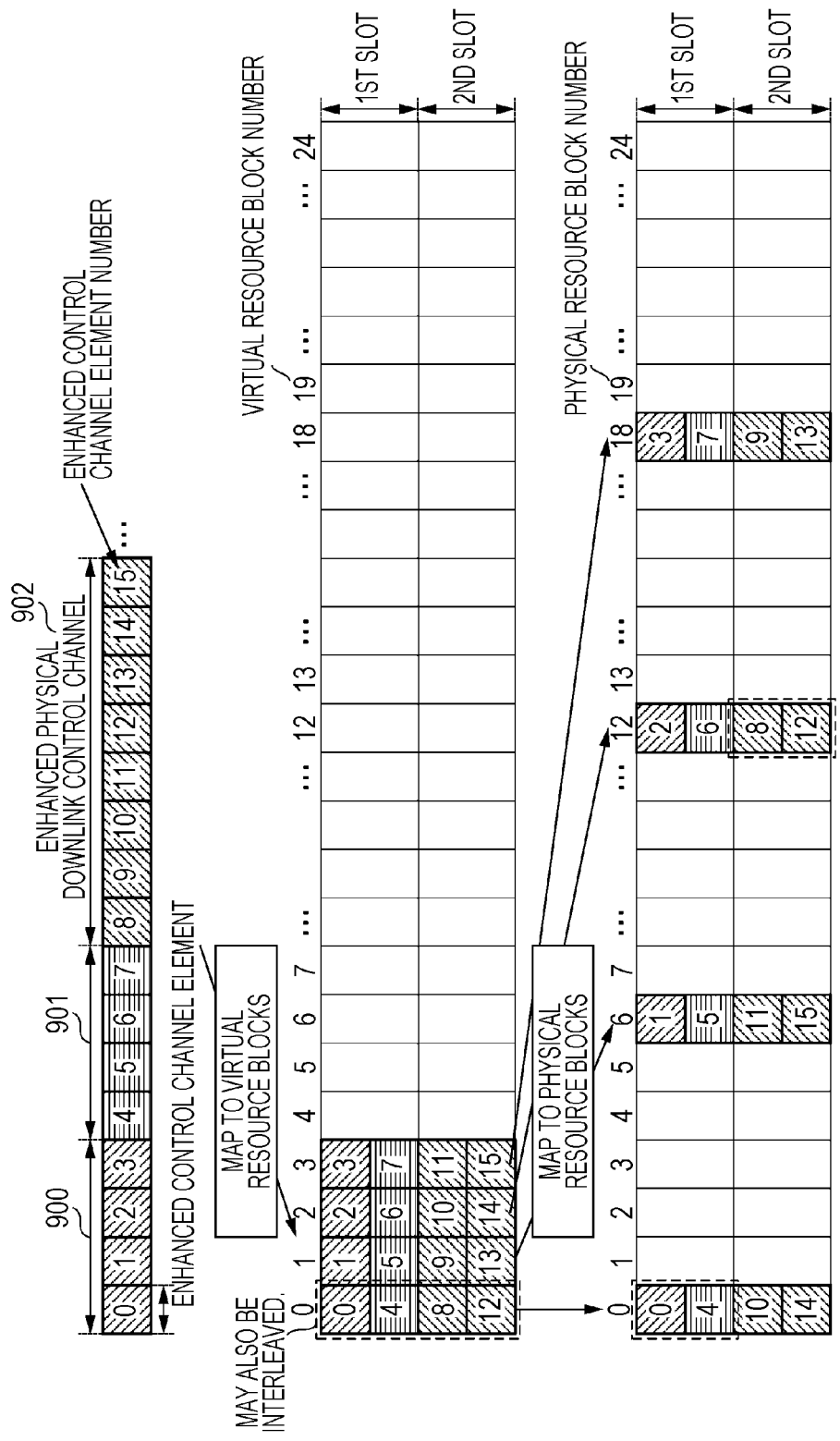
FIG. 9 is a diagram illustrating a method of mapping the E-PDCCH in the enhanced common search space to resource elements according to the present embodiment.

The enhanced common search space is made up of control channel elements with predetermined numbers. The aggregation level 4 enhanced common search space and the aggregation level 8 enhanced common search space are made up of enhanced control channel elements 0 to 15. FIG. 9 is a diagram illustrating a method of mapping the E-PDCCH in the enhanced common search space to resource elements according to the present embodiment. In FIG. 9, the number 900 and the number 901 indicate E-PDCCHs in the enhanced common search space transmitted by the base station device 3 using four enhanced control channels. In FIG. 9, the number 902 indicates an E-PDCCH in the enhanced common search space transmitted by the base station device 3 using eight control channels. In FIG. 9, the bold squares indicate enhanced control channel elements. In FIG. 9, the numbers labeling the bold squares indicate enhanced control channel element numbers.

The base station device 3 maps the enhanced control channel elements 0 to 15 onto the virtual resource blocks 0 to 3. The base station device 3 maps two enhanced control channel elements onto one virtual resource block. In other words, the base station device 3 maps four enhanced control channel elements onto one virtual resource block pair made up of a virtual resource block in the first slot, and a virtual resource block in the second slot with the same number as the number of the virtual resource block in the first slot. Next, the base station device 3 maps virtual resource blocks to physical resource blocks distributed in the frequency domain. The base station device 3 maps virtual resource blocks in the first slot to physical resource blocks in the first slot. The base station device 3 maps virtual resource blocks in the second slot to physical resource blocks in the second slot.

In FIG. 9, the enhanced physical downlink control channels with the number 900 and the number 901 are mapped only to the first slot, while the enhanced physical downlink control channel with the number 902 is mapped only to the second slot. Consequently, there is a problem in that the benefit of diversity in the time domain is not obtained for the enhanced physical downlink control channels. Accordingly, the base station device 3 interleaves the enhanced control channel elements mapped to virtual resource block pairs in units of modulation symbols or modulation symbol groups. At this point, the number of modulation symbols constituting a modulation symbol group is preferably smaller than the number of modulation symbols corresponding to the enhanced control channel elements. The base station device 3 maps the virtual resource block in the first slot and the second virtual resource block of a virtual resource block pair with interleaved modulation symbols onto physical resource blocks distributed in the frequency domain. Consequently, since a single enhanced physical downlink control channel is mapped in a distributed manner between the first slot and the second slot in the time domain, it becomes possible to obtain the benefits of diversity in the time domain. For example, in FIG. 9, the enhanced control channel elements 0, 4, 8, and 12 are mapped in a distributed manner between the physical resource block 0 in the first slot and the physical resource block 12 in the second slot.

As a result, since enhanced physical downlink control channels (downlink control information) are transmitted using distributed resource elements, the advantages of frequency diversity and time diversity may be obtained.

Figure 10:
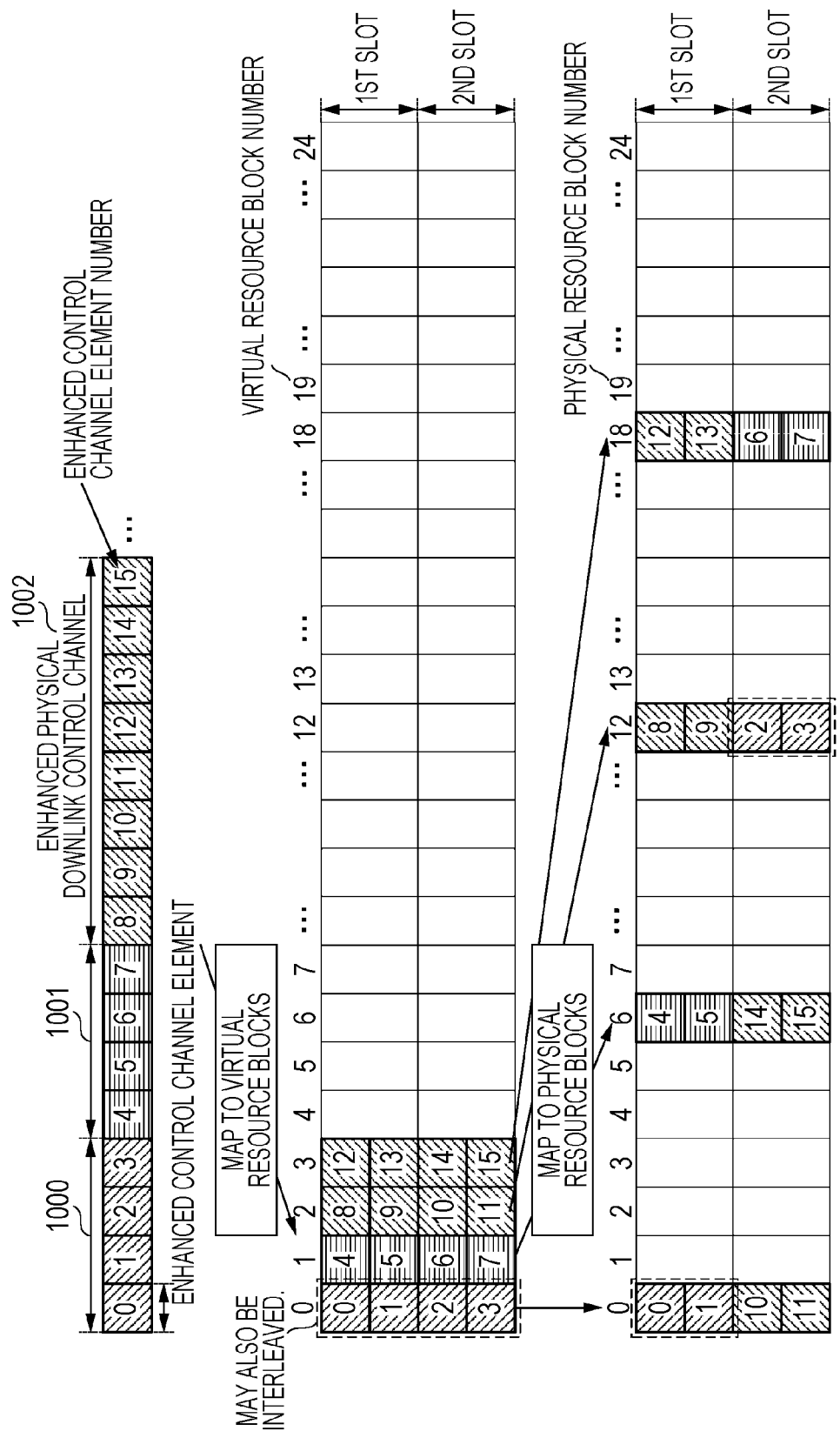
FIG. 10 is a diagram illustrating another method of mapping the E-PDCCH in the enhanced common search space to resource elements according to the present embodiment.

Note that the base station device 3 may also map enhanced control channel elements to virtual resource blocks according to a method other than the method described in FIG. 9. FIG. 10 is a diagram illustrating another method of mapping the E-PDCCH in the enhanced common search space to resource elements according to the present embodiment. In addition, the base station device 3 may also map a number of enhanced control channel elements other than 4 to one virtual resource block pair.

Figure 11:
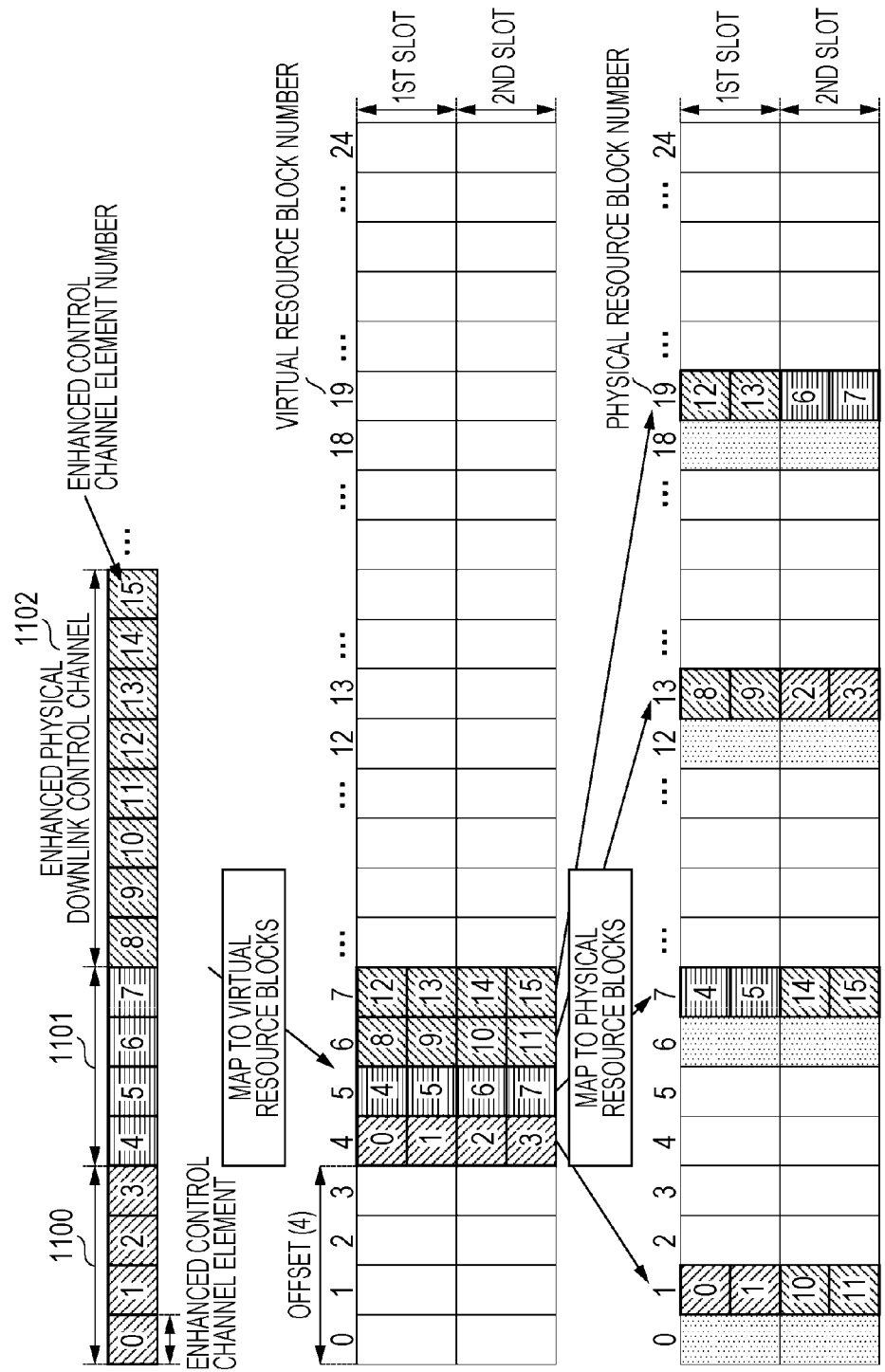
FIG. 11 is a diagram illustrating a method using an offset when mapping the E-PDCCH in the enhanced common search space to resource elements according to the present embodiment.

In FIGS. 9 and 10, multiple base station devices 3 would construct enhanced common search spaces on the same physical resource blocks (physical resource blocks 0, 6, 12, and 18). Consequently, the E-PDCCH transmitted in the enhanced common search space by a given base station device 3 would interfere with the E-PDCCH transmitted in the enhanced common search space by another base station device 3. Accordingly, an offset is used in the case in which the base station device 3 decides the virtual resource block to which to map enhanced control channel elements. FIG. 11 is a diagram illustrating a method using an offset when mapping the E-PDCCH in the enhanced common search space to resource elements according to the present embodiment. In FIGS. 9 and 10, enhanced control channel elements are mapped to the virtual resource blocks 0 to 3, but in FIG. 11, enhanced control channel elements are mapped to the virtual resource blocks from 4 to 7. In other words, in FIG. 11, a value of 4 is used as an offset when deciding the virtual resource block to which to map enhanced control channel elements.

The base station device 3 may also receive information indicating an offset value to be used by that base station device 3 from another base station device 3. The base station device 3 may also decide on an offset value to be used by the device itself from such received information indicating an offset value. The base station device 3 may also transmit information indicating such a decided offset value to another base station device 3. The base station device 3 may also transmit information indicating such a decided offset value in the PBCH. Consequently, the mobile station device 1 becomes able to receive information indicating an offset value in the PBCH, and ascertain the physical resource block in which the E-PDCCH in the enhanced common search space is transmitted.

In addition, the base station device 3 may also compute an offset value on the basis of the device's own physical layer cell identity. The mobile station device 1 detects the physical layer cell identity of a base station device 3 from the synchronization signal transmitted by that base station device 3. Consequently, the mobile station device 1 is able to compute an offset value on the basis of a physical layer cell identity detected from a synchronization signal being transmitted by the base station device 3. Consequently, since the base station device 3 no longer has to transmit information indicating an offset value to the mobile station device 1, the signal overhead from the base station device 3 to the mobile station device 1 may be reduced.

Consequently, in FIG. 11, the E-PDCCH in the enhanced common search space is mapped to different physical resource blocks than in FIGS. 9 and 10. In FIGS. 9 and 10, the base station device 3 maps the E-PDCCH in the enhanced common search space to the physical resource blocks 0, 6, 12, and 18. On the other hand, in FIG. 11, the base station device 3 maps the E-PDCCH in the enhanced common search space to the physical resource blocks 1, 7, 13, and 19. For example, by having a given base station device 3 use 0 as an offset value and another base station device 3 use 4 as an offset value, interference between E-PDCCHs in the enhanced common search space may be avoided.

Figure 12:
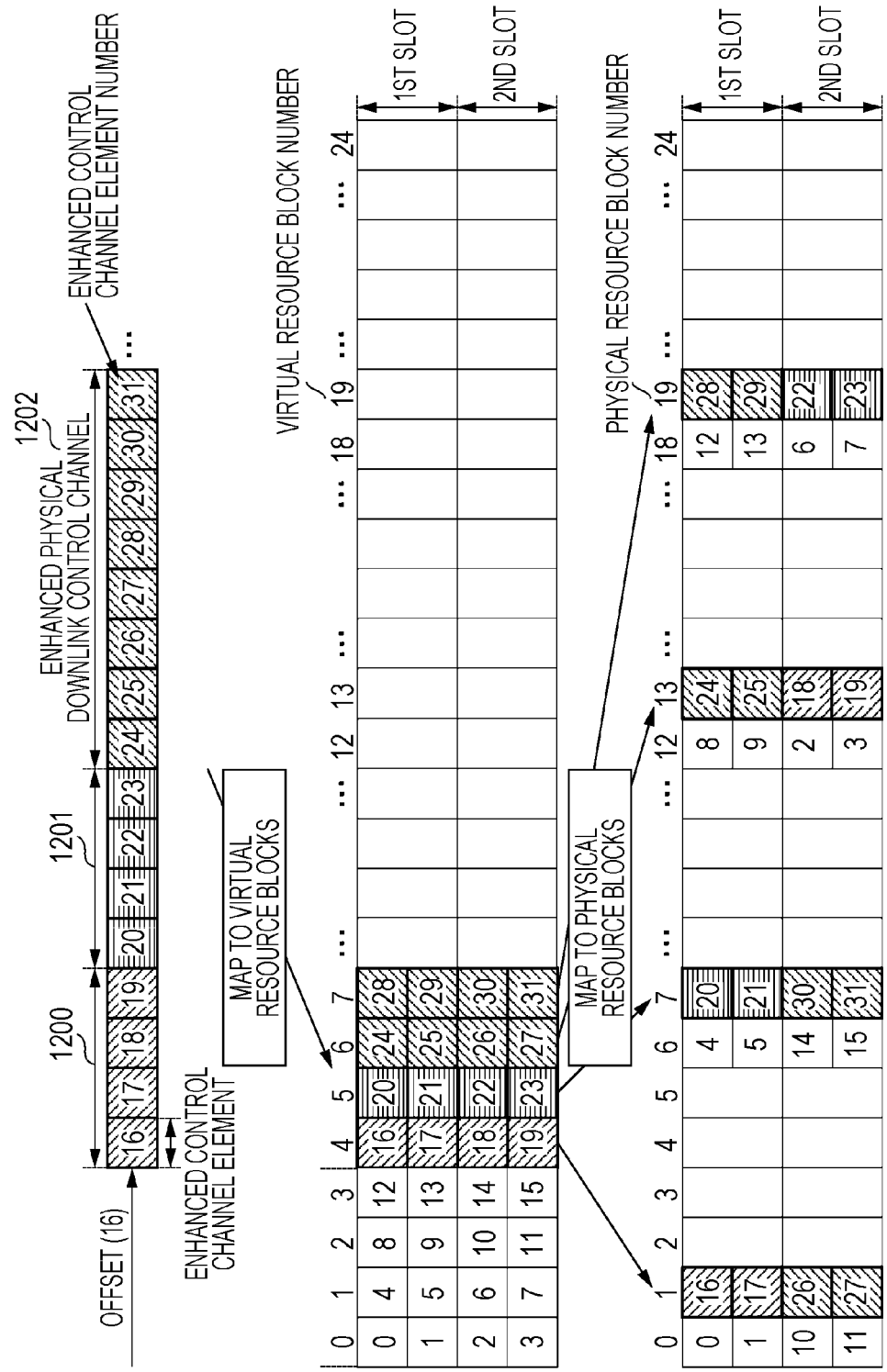
FIG. 12 is a diagram illustrating another method using an offset when mapping the E-PDCCH in the enhanced common search space to resource elements according to the present embodiment.

FIG. 12 is a diagram illustrating another method using an offset when mapping the E-PDCCH in the enhanced common search space to resource elements according to the present embodiment. In FIG. 12, the base station device 3 uses an offset when deciding the enhanced control channel elements constituting the enhanced common search space. In FIG. 12, the offset value is 16. Consequently, in FIG. 12, the enhanced common search space is made up of the enhanced control channel elements 16 to 31. In FIG. 12, the enhanced control channel elements 16 to 31 are mapped to the virtual resource blocks 4 to 7. Consequently, the method of FIG. 12 is able to obtain advantages similar to using 4 as the offset value in FIG. 11.

[Enhanced UE-Specific Search Space]

Hereinafter, the enhanced UE-specific search space according to the present embodiment will be described.

Figure 13:
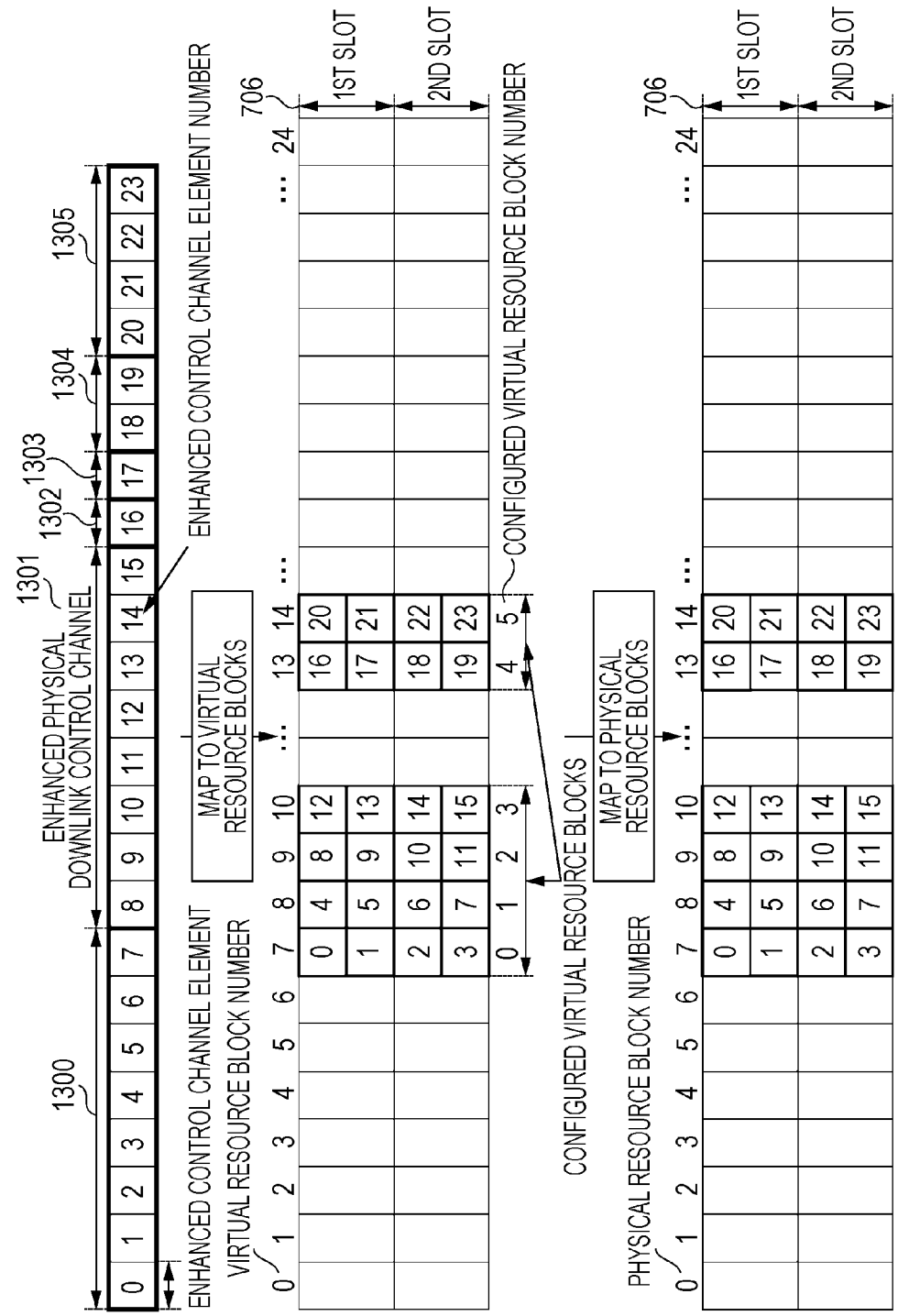
FIG. 13 is a diagram illustrating a method of mapping the E-PDCCH in the enhanced UE-specific search space to resource elements according to the present embodiment.

FIG. 13 is a diagram illustrating a method of mapping the E-PDCCH in the enhanced UE-specific search space to resource elements according to the present embodiment. In FIG. 13, the number 1300 and the number 1301 indicate E-PDCCHs in the enhanced UE-specific search space transmitted by the base station device 3 using eight enhanced control channels. In FIG. 13, the number 1302 and the number 1303 indicate E-PDCCHs in the enhanced UE-specific search space transmitted by the base station device 3 using one enhanced control channel. In FIG. 13, the number 1304 indicates an E-PDCCH in the enhanced UE-specific search space transmitted by the base station device 3 using two enhanced control channels. In FIG. 13, the number 1305 indicates an E-PDCCH in the enhanced UE-specific search space transmitted by the base station device 3 using four enhanced control channels.

The base station device 3 configures virtual resource blocks to which to map enhanced control channel elements corresponding to the enhanced UE-specific search space. Hereinafter, such configured virtual resource blocks will be simply designated the "configured virtual resource blocks". The base station device 3 transmits dedicated radio resource configuration information, including information indicating the configured virtual resource blocks, to the mobile station device 1. The mobile station device 1, upon receiving the dedicated radio resource configuration information, configures virtual resource blocks to which to map enhanced control channel elements corresponding to the enhanced UE-specific search space, on the basis of the information indicating the configured virtual resource blocks included in the dedicated radio resource configuration information. The base station device 3 is able to configure different virtual resource blocks as the configured virtual resource blocks for each mobile station device 1. In addition, the base station device 3 is able to configure the same virtual resource blocks as the configured virtual resource blocks to a group of mobile station devices 1. In addition, the base station device 3 is able to configure the same virtual resource blocks as the configured virtual resource blocks to all mobile station devices 1.

In FIG. 13, the virtual resource blocks 7, 8, 9, 10, 13, and 14 are the configured virtual resource blocks. The number of the configured virtual resource block with the smallest virtual resource block number is 0. In FIG. 13, 0 is the number of the configured virtual resource block configured with the virtual resource block whose virtual resource block number is 7. The number of enhanced control channel elements corresponding to the enhanced UE-specific search space depends on the number of configured virtual resource blocks. The number of enhanced control channel elements corresponding to the enhanced UE-specific search space may be computed by multiplying the number of configured virtual resource blocks by the number of enhanced control channel elements mapped to one virtual resource block. In FIG. 13, since the number of configured virtual resource blocks is 6, and the number of enhanced control channel elements mapped to one virtual resource block is 4, the number of enhanced control channel elements corresponding to the enhanced UE-specific search space is 24.

The base station device 3 additionally configures the enhanced control channel elements to constitute the enhanced UE-specific search space from among the enhanced control channel elements corresponding to the enhanced UE-specific search space. The base station device 3 transmits dedicated radio resource configuration information, including information indicating the enhanced control channel elements constituting the enhanced UE-specific search space, to the mobile station device 1. The mobile station device 1, upon receiving the dedicated radio resource configuration information, configures the enhanced UE-specific search space to monitor for the E-PDCCH, on the basis of the information indicating the enhanced control channel elements constituting the enhanced UE-specific search space included in the dedicated radio resource configuration information. The base station device 3 may also configure a different start point of the enhanced UE-specific search space for each aggregation level for the mobile station device 1. The base station device 3 may also configure a start point of the enhanced UE-specific search space that is common for all aggregation levels for the mobile station device 1. The base station device 3 may also configure a different start point of the enhanced UE-specific search space for each mobile station device 1. In addition, the base station device 3 may also configure the same start point of the enhanced UE-specific search space for a group of mobile station devices 1.

For example, in FIG. 13, the base station device 3 may configure 8 as the common start point for the enhanced UE-specific search space of all aggregation levels for a given mobile station device 1. In this case, the aggregation level 1 enhanced UE-specific search space is made up of the enhanced control channel elements 8 to 13. Also, the aggregation level 2 enhanced UE-specific search space is made up of the enhanced control channel elements 8 to 19. Also, the aggregation level 4 enhanced UE-specific search space is made up of the enhanced control channel elements 8 to 23. Also, the aggregation level 8 enhanced UE-specific search space is made up of the enhanced control channel elements 8 to 23.

The base station device 3 maps enhanced control channel elements corresponding to the enhanced UE-specific search space to the configured virtual resource blocks. After that, the base station device 3 maps the configured virtual resource blocks to physical resource blocks with the same numbers as the numbers of the configured virtual resource blocks. Note that the base station device 3 may be configured to map virtual resource blocks corresponding to the UE-specific search space to physical resource blocks with different numbers than the numbers of the virtual resource blocks, or to physical resource blocks with the same numbers as the numbers of the virtual resource blocks.

[Initial Connection Establishment Procedure]

Hereinafter, an initial connection establishment procedure according to the present embodiment will be described.

Figure 14:
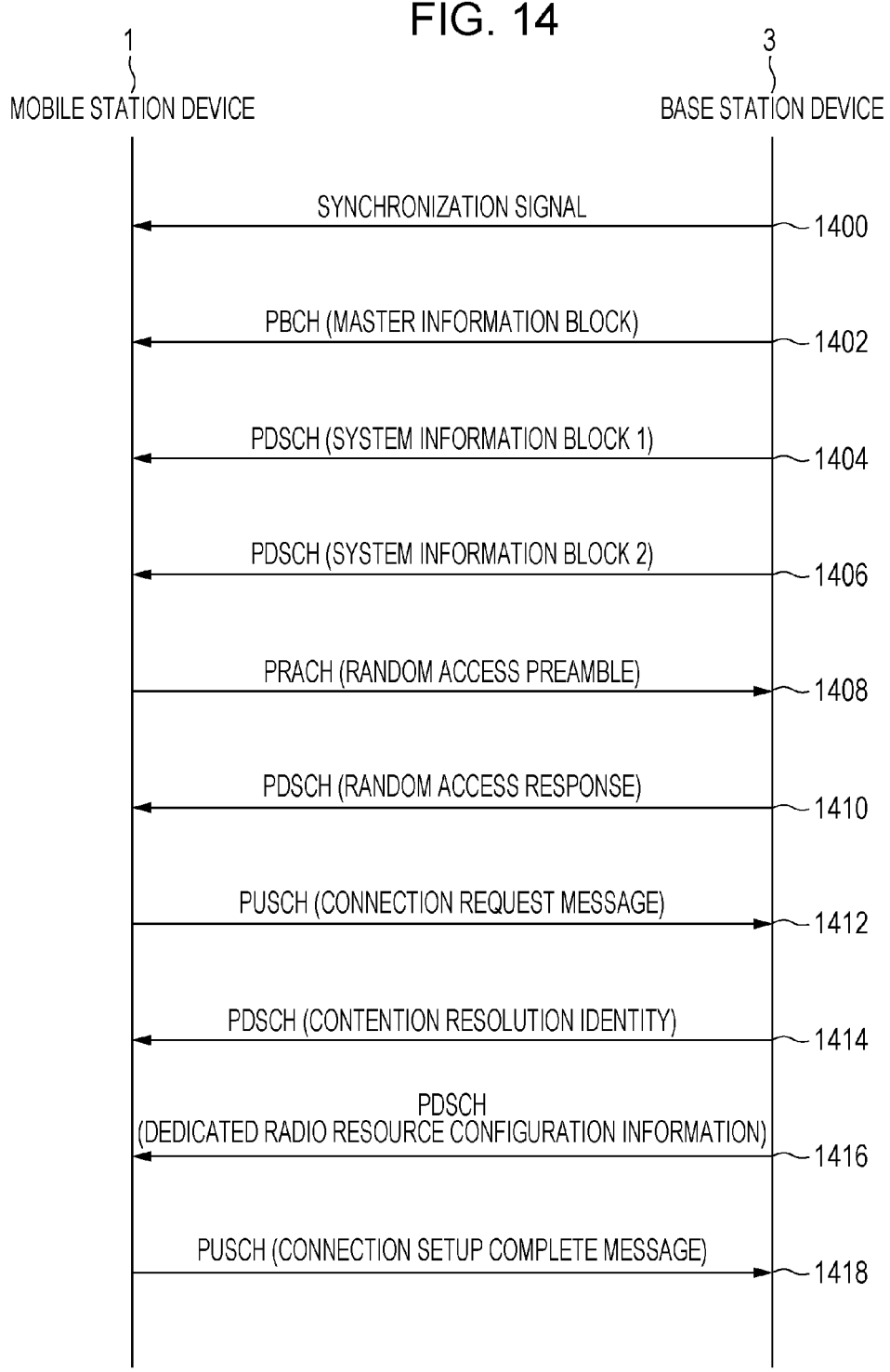
FIG. 14 is a diagram for explaining initial connection establishment between a base station device and a mobile station device according to the present embodiment.

FIG. 14 is a diagram for explaining initial connection establishment between the base station device 3 and the mobile station device 1 according to the present embodiment. First, FIG. 14 will be used to describe initial connection establishment procedure between the base station device 3 and the mobile station device 1 on a backward compatible component carrier.

First, the mobile station device 1 conducts cell detection (a cell search) using a synchronization signal transmitted by the base station device 3 on the central 72 subcarriers of the cell (1400). On the basis of the synchronization signal, the mobile station device 1 acquires time timings, frequency timings, and a physical layer cell identity. The mobile station device 1 acquires a master information block using the PBCH transmitted by the base station device 3 on the central 72 subcarriers of the cell (1402). From information included in the master information block, the mobile station device 1 configures the downlink bandwidth of the cell and the system frame number.

The master information block includes 1-bit information indicating the component carrier type. The base station device 3 sets the 1-bit information indicating the component carrier type to 0 when communicating with the mobile station device 1 using a backward compatible component carrier. In other words, in the case in which the PDCCH and E-PDCCH are placed in the cell used for communication with the mobile station device 1, the base station device 3 instructs the mobile station device 1 to monitor the common search space for the PDCCH with the 1-bit information indicating the component carrier type. In the case in which the 1-bit information indicating the component carrier type has been set to 0, the mobile station device 1 configures itself to monitor the common search space and the UE-specific search space for the PDCCH.

Also, the base station device 3 sets the 1-bit information indicating the component carrier type to 1 when communicating with the mobile station device 1 using a non-backward compatible component carrier. In other words, in the case in which the PDCCH is not placed but the E-PDCCH is placed in the cell used for communication with the mobile station device 1, the base station device 3 instructs the mobile station device 1 to monitor the enhanced common search space for the PDCCH with the 1-bit information indicating the component carrier type. In the case in which the 1-bit information indicating the component carrier type has been set to 1, the mobile station device 1 configures itself to monitor the enhanced common search space and the enhanced UE-specific search space for the E-PDCCH. Consequently, the 1-bit information indicating the component carrier type may also be referred to as information instructing the mobile station device 1 to monitor the PDCCH or the E-PDCCH. As a result, the mobile station device 1 is no longer required to monitor for both the PDCCH and the E-PDCCH, and thus the load of the DCI format receiving process on the mobile station device 1 may be reduced.

The mobile station device 1 acquires a system information block 1 transmitted by the base station device 3 using the PDSCH (1404). The system information block 1 includes information related to the transmission timings of system information blocks other than the system information block 1.

The mobile station device 1 acquires a system information block 2 transmitted by the base station device 3 using the PDSCH (1406). The system information block 2 includes radio resource configuration information that is common to multiple mobile station devices 1. Such common radio resource configuration information includes information related to the PRACH configuration. The mobile station device 1 configures the PRACH in accordance with the information related to the PRACH configuration. The base station device 3 transmits the DCI format used for scheduling of system information blocks using the PDCCH in the common search space.

The mobile station device 1 randomly selects a random access preamble number. The mobile station device 1 uses the PRACH to transmit the random access preamble of the selected number to the base station device 3 (1408). The base station device 3 receives the random access preamble transmitted in the PRACH. The base station device 3 uses the random access preamble to estimate the uplink transmission timings. The base station device 3 transmits a random access response in the PDSCH. The random access response includes multiple pieces of information regarding the random access preamble detected by the base station device 3. The multiple pieces of information are the random access preamble number, a temporary cell-radio network temporary identifier, a timing advance (TA) command, and information used for PUSCH scheduling (random access response grant). The timing advance (TA) command is used to instruct the mobile station device 1 to adjust the uplink transmission timings. In the case in which the transmitted random access preamble number is included in the random access response, the mobile station device 1 determines that the relevant random access response is targeted to the device itself. The base station device 3 transmits the DCI format used for scheduling of the random access response using the PDCCH in the common search space.

The mobile station device 1 adjusts the uplink transmission timings on the basis of the TA command included in the random access response. The mobile station device 1 transmits a connection request message to the base station device 3 using the PUSCH scheduled by the random access response grant (1412). The connection request message includes an identifier that identifies the mobile station device 1 (Initial UE-Identity). In the case in which S-TMSI is provided, the mobile station device 1 sets an identifier for identifying the mobile station device 1 within the tracking area (System architecture evolution Temporary Mobile Subscriber Identity (S-TMSI)) to the Initial UE-Identity. Meanwhile, in the case in which S-TMSI is not provided, the mobile station device 1 randomly selects a value from the range 0 to $2^{40}-1$, and sets the selected value to the Initial UE-Identity.

The base station device 3 transmits a contention resolution identity with the same value as the Initial UE-Identity included in the PUSCH received from the mobile station device 1 to the mobile station device 1 using the PDSCH (1414). In the case in which the value of the received contention resolution identity and the value of the transmitted Initial UE-Identity match, the mobile station device 1 (1) regards contention resolution of the random access preamble as successful, (2) sets the value of the temporary cell-radio network temporary identifier to the cell-radio network temporary identifier, (3) discards the temporary cell-radio network temporary identifier, and (4) regards the random access procedure as successfully completed.

The base station device 3 transmits the DCI format corresponding to the PUSCH used to transmit the contention resolution identity using the PDCCH in the common search space or the UE-specific search space. At this point, the UE-specific search space is decided on the basis of the temporary cell-radio network temporary identifier assigned to the mobile station device 1.

The base station device 3 transmits dedicated radio resource configuration information to the mobile station device 1 using the PDSCH (1416). The base station device 3 is able to use the dedicated radio resource configuration information to configure which search space the mobile station device 1 monitors for the DCI format. In addition, the base station device 3 is able to use the dedicated radio resource configuration information to configure the enhanced UE-specific search space. The base station device 3 transmits the DCI format used for scheduling of the dedicated radio resource configuration information using the PDCCH in the common search space or the UE-specific search space. At this point, the UE-specific search space is decided on the basis of the cell-radio network temporary identifier.

The base station device 3 transmits the DCI format used for scheduling of the PUSCH in the search space configured using the dedicated radio resource configuration information. The mobile station device 1 transmits to the base station device 3 a connection setup complete message indicating that configuration was completed in accordance with the dedicated radio resource configuration information using the scheduled PUSCH (1418). After successfully transmitting the connection setup complete message, the mobile station device 1 regards the initial connection establishment procedure as successfully completed.

Next, FIG. 14 will be used to describe initial connection establishment between the base station device 3 and the mobile station device 1 on a non-backward compatible component carrier. Description will not be repeated for items common to the initial connection establishment between the base station device 3 and the mobile station device 1 on a backward compatible component carrier.

The mobile station device 1 acquires a master information block using the PBCH transmitted by the base station device 3 on the central 72 subcarriers of the cell (1402). From information included in the master information block, the mobile station device 1 configures the downlink bandwidth of the cell and the system frame number. In addition, in the case in which the 1-bit information indicating the component carrier type included in the master information block has been set to 1, the mobile station device 1 configures itself to monitor the enhanced common search space and the enhanced UE-specific search space for the E-PDCCH.

The base station device 3 transmits the DCI format used for scheduling of system information blocks using the E-PDCCH in the enhanced common search space. The mobile station device 1 monitors the enhanced common search space for the DCI format used for scheduling of system information blocks (1404, 1406). The base station device 3 transmits the system information block 2 including information indicating the enhanced UE-specific search space. In other words, the base station device 3 broadcasts information indicating the enhanced UE-specific search space. The mobile station device 1 configures the enhanced UE-specific search space on the basis of the information indicating the enhanced UE-specific search space included in the system information block 2. Consequently, on a non-backward compatible component carrier, the mobile station device 1 is able to configure the UE-specific search space before receiving dedicated radio resource control information. In addition, the base station device 3 is able to transmit the DCI format to the mobile station device 1 using the enhanced UE-specific search space before transmitting dedicated radio resource control information to the mobile station device 1.

Note that on a non-backward compatible component carrier, the UE-specific search space before the mobile station device 1 receives dedicated radio resource control information may be made up of enhanced control channel elements, virtual resource blocks, or physical resource blocks with predetermined numbers. In addition, on a non-backward compatible component carrier, the mobile station device 1 may also configure virtual resource blocks corresponding to the enhanced UE-specific search space on the basis of the information indicating the enhanced UE-specific search space included in the system information block 2. In addition, the mobile station device 1 may also regard enhanced control channel elements with predetermined numbers from among the enhanced control channel elements corresponding to such configured virtual resource blocks as being the enhanced UE-specific search space. In addition, the mobile station device 1 may also regard configured virtual resource blocks with predetermined numbers from among such configured virtual resource blocks as being the enhanced UE-specific search space.

However, if the mobile station device 1 configures the enhanced UE-specific search space on the basis of information indicating the enhanced UE-specific search space included in the system information block 2, there is a problem in that multiple mobile station devices 1 would configure the same enhanced UE-specific search space, and there would be insufficient resources for the enhanced UE-specific search space. Accordingly, after the initial connection establishment procedure ends, the base station device 3 preferably reconfigures the enhanced UE-specific search space using the dedicated radio resource control information.

The base station device 3 transmits the DCI format used for scheduling of the random access response using the PDCCH in the common search space. The mobile station device 1 monitors the enhanced common search space for the DCI format used for scheduling of the random access response (1410).

The base station device 3 transmits the DCI format corresponding to the PUSCH used to transmit the contention resolution identity using the E-PDCCH in the enhanced common search space or the enhanced UE-specific search space. At this point, the enhanced UE-specific search space is configured on the basis of the information indicating the enhanced UE-specific search space included in the system information block 2.

The base station device 3 transmits dedicated radio resource configuration information to the mobile station device 1 using the PDSCH (1416). The base station device 3 is able to use the dedicated radio resource configuration information to reconfigure the enhanced UE-specific search space. The base station device 3 transmits the DCI format used for scheduling of the dedicated radio resource configuration information using the E-PDCCH in the enhanced common search space or the enhanced UE-specific search space. At this point, the enhanced UE-specific search space is configured on the basis of the information indicating the enhanced UE-specific search space included in the system information block 2.

The base station device 3 transmits the DCI format used for scheduling of the PUSCH in the enhanced common search space or the UE-specific search space configured using the dedicated radio resource configuration information. The mobile station device 1 transmits to the base station device 3 a connection setup complete message indicating that configuration was completed in accordance with the dedicated radio resource configuration information using the scheduled PUSCH (1418). After successfully transmitting the connection setup complete message, the mobile station device 1 regards the initial connection establishment procedure as successfully completed.

Note that in the case in which the PDCCH and E-PDCCH are placed in the cell used to communicate with the mobile station device 1, the base station device 3 may also instruct the mobile station device 1 to monitor the common search space for the PDCCH or monitor the enhanced common search space for the E-PDCCH with the information that instructs the mobile station device 1 to monitor for the PDCCH or E-PDCCH. However, the mobile station device 1 instructed by such information to monitor for the E-PDCCH during the initial connection establishment procedure is unable to identify whether the PCFICH is being transmitted on a component carrier. For this reason, the mobile station device 1 is unable to identify the OFDM symbols in which the PDCCH and E-PDCCH are placed, and is unable to correctly monitor for the E-PDCCH.

Accordingly, the base station device 3 may also use the PBCH to transmit information instructing the mobile station device 1 to monitor for the PDCCH or E-PDCCH, together with information indicating the OFDM symbols in which the E-PDCCH is placed. In the case of being instructed to monitor for the E-PDCCH by information instructing to monitor for the PDCCH or E-PDCCH, the mobile station device 1 recognizes the OFDM symbols in which the E-PDCCH is placed on the basis of the information indicating the OFDM symbols in which the E-PDCCH is placed. Meanwhile, in the case of being instructed to monitor for the PDCCH by information instructing to monitor for the PDCCH or E-PDCCH, the mobile station device 1 recognizes the OFDM symbols in which the PDCCH is placed on the basis of information received using the PCFICH.

In addition, the OFDM symbols in which the E-PDCCH is placed may also be predefined. For example, the OFDM symbols in which the E-PDCCH is placed may always be the OFDM symbols in the first slot excluding the 0th, 1st, and 2nd OFDM symbols, as well as all OFDM symbols in the second slot.

Consequently, in the case in which the PDCCH and E-PDCCH are placed in the cell used to communicate with the mobile station device 1, the base station device 3 instructs the mobile station device 1 to monitor the common search space for the PDCCH or monitor the enhanced common search space for the E-PDCCH with the information that instructs the mobile station device 1 to monitor for the PDCCH or E-PDCCH. Even in this case, the mobile station device 1 is able to correctly monitor for the E-PDCCH.

Note that the enhanced common search space may be constructed inside the central 72 subcarriers of the cell, and the base station device 3 may transmit the system information block 1 and the system information block 2 using the PDSCH placed inside the central 72 subcarriers of the cell. Consequently, in FIG. 14, before conducting the process of receiving the random access response and the DCI format used for scheduling of the random access response, the mobile station device 1 is able to receive the system information block 1 and the system information block 2 from the base station device 3 using only the central 72 subcarriers of the cell, and thus the load of the receiving process on the mobile station device 1 may be reduced.

[Process of Switching the Space to Monitor for the DCI Format]

Hereinafter, a process of switching the search space to monitor for the DCI format in the mobile station device 1 according to the present embodiment will be described.

Figure 15:
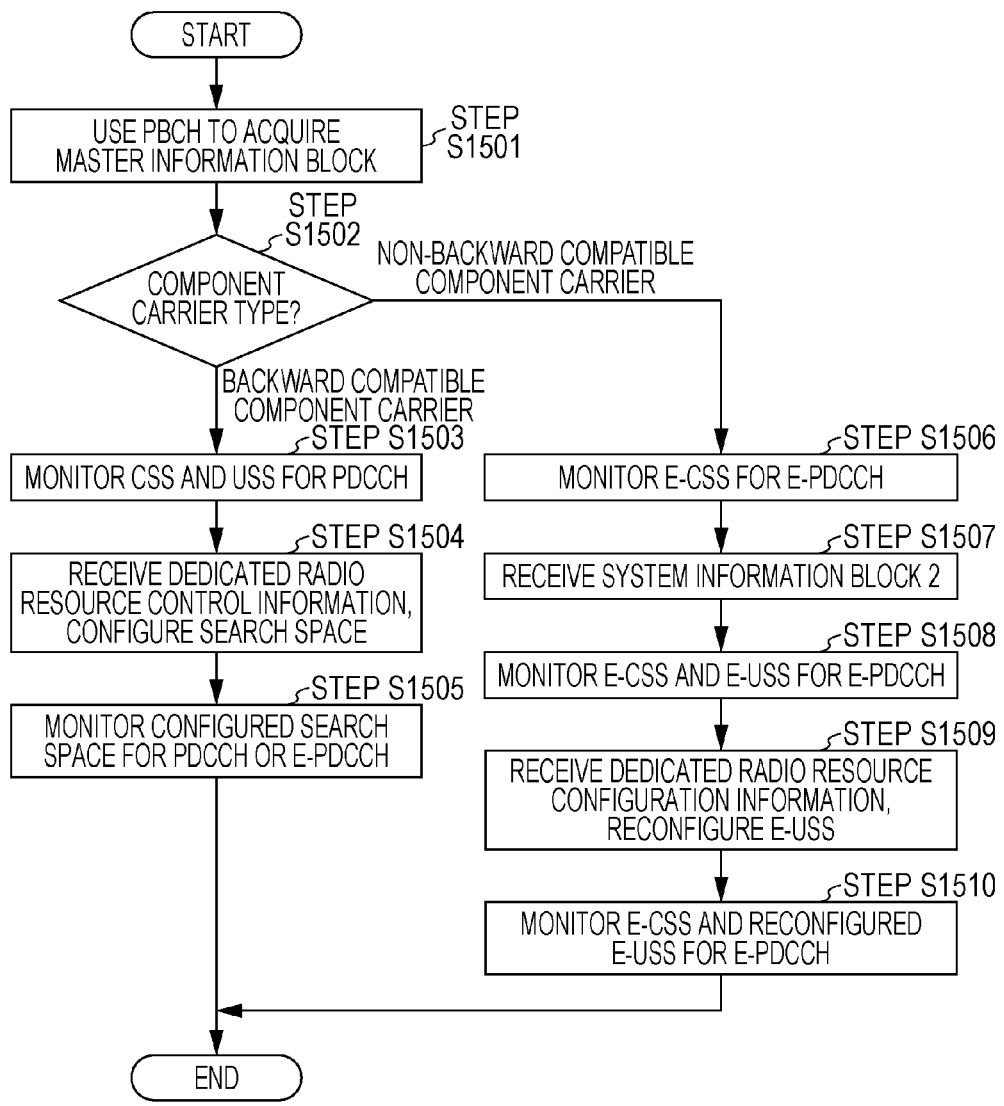
FIG. 15 is a flowchart illustrating a process of switching the search space to monitor for the DCI format in a mobile station device according to the present embodiment.

FIG. 15 is a flowchart illustrating a process of switching the search space to monitor for the DCI format in the mobile station device 1 according to the present embodiment. The mobile station device 1 receives a master information block using the PBCH (step S1501). The mobile station device 1 identifies the component carrier type on the basis of 1-bit information indicating the component carrier type included in the master information block (step S1502).

In step S1502, in the case of regarding the component carrier type to be a backward compatible component carrier, the mobile station device 1 monitors the common search space (CSS) and the UE-specific search space (USS) for the PDCCH (step S1503). After step S1503, the mobile station device 1 receives dedicated radio resource control information. In addition, the mobile station device 1 configures the search space to monitor for the PDCCH or E-PDCCH in accordance with the dedicated radio resource control information (step S1504). The mobile station device 1 monitors for the PDCCH or the E-PDCCH in in the configured search space (one of either the common search space or the enhanced common search space, and one of either the UE-specific search space or the enhanced UE-specific search space) (step S1505).

In step S1502, in the case of regarding the component carrier type to be a non-backward compatible component carrier, the mobile station device 1 monitors the enhanced common search space (E-CSS) for the E-PDCCH (step S1506). After step S1506, the mobile station device 1 receives the system information block 2 (step S1507). The mobile station device 1 monitors the enhanced common search space (E-CSS), and the enhanced UE-specific search space (E-USS) configured on the basis of the system information block, for the E-PDCCH (step S1508).

After step S1508, the mobile station device 1 receives dedicated radio resource control information. In addition, the mobile station device 1 reconfigures the enhanced UE-specific search space (E-USS) on the basis of the dedicated radio resource control information (step S1509). The mobile station device 1 monitors the enhanced common search space (E-CSS), and the reconfigured enhanced UE-specific search space (E-USS), for the E-PDCCH (step S1510). The mobile station device 1 also reconfigures the search space on the basis of received dedicated radio resource control information after step S1505 or step S1510. In addition, after step S1510, the mobile station device 1 does not reconfigure the enhanced UE-specific search space (E-USS), even if the system information block 2 is received again. In other words, in the case in which the enhanced UE-specific search space (E-USS) has been configured on the basis of dedicated radio resource control information, the mobile station device 1 does not configure (reconfigure) the enhanced UE-specific search space (E-USS) on the basis of an additionally received system information block.

[Device Configurations]

Hereinafter, device configurations according to the present embodiment will be described.

Figure 16:
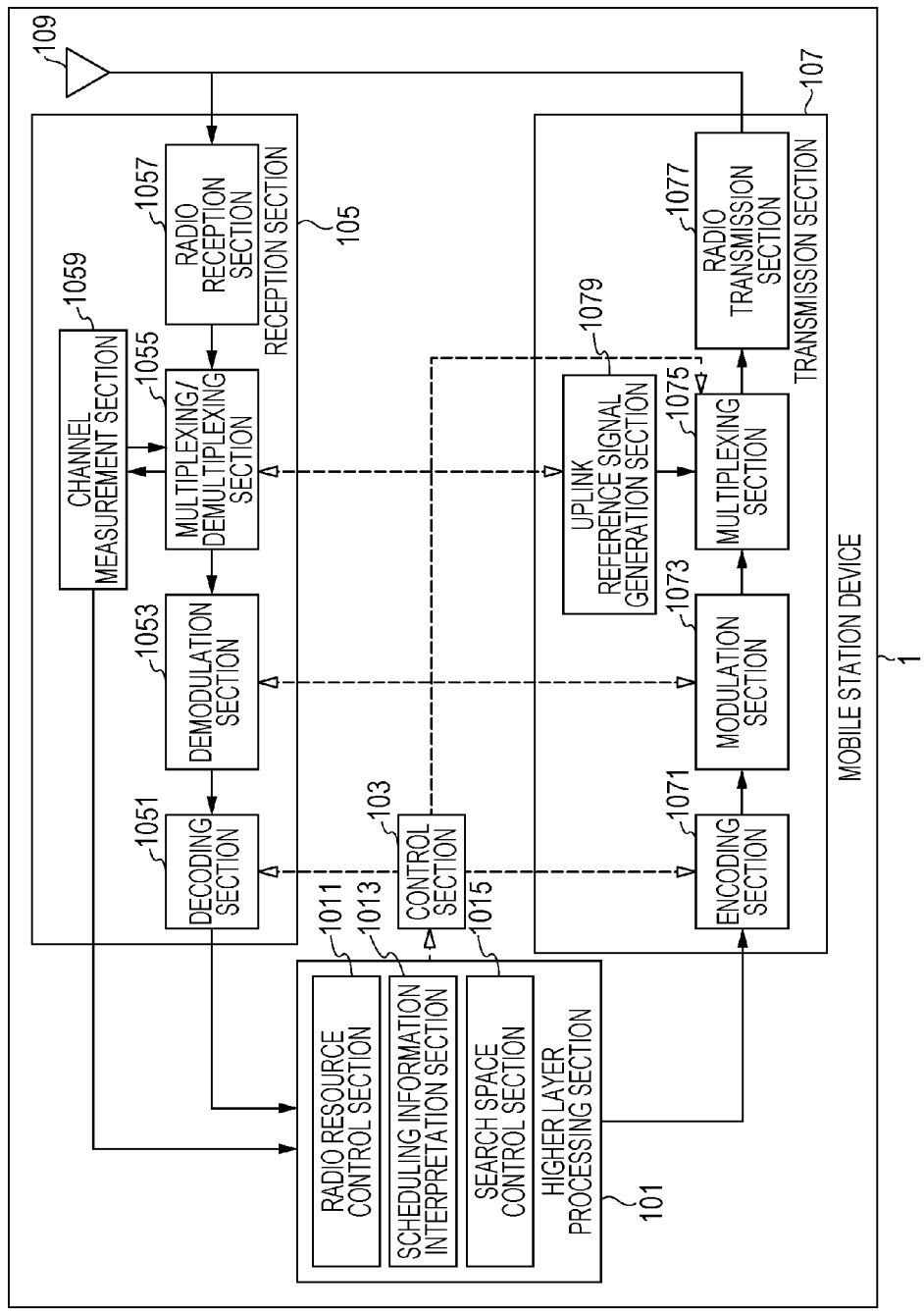
FIG. 16 is a schematic block diagram illustrating a configuration of a mobile station device according to the present embodiment.

FIG. 16 is a schematic block diagram illustrating a configuration of the mobile station device 1 according to the present embodiment. As illustrated in the drawing, the mobile station device 1 comprises a higher layer processing section 101, a control section 103, a reception section 105, a transmission section 107, and a transceiving antenna 109. In addition, the higher layer processing section 101 comprises a radio resource control section 1011, a scheduling information interpretation section 1013, and a search space control section 1015. In addition, the reception section 105 comprises a decoding section 1051, a demodulation section 1053, a multiplexing/demultiplexing section 1055, a radio reception section 1057, and a channel measurement section 1059. In addition, the transmission section 107 comprises an encoding section 1071, a modulation section 1073, a multiplexing section 1075, a radio transmission section 1077, and an uplink reference signal generation section 1079.

The higher layer processing section 101 outputs uplink data (transport blocks) generated by user operations or the like to the transmission section 107. In addition, the higher layer processing section 101 conducts processing in the medium access control (MAC) layer, the packet data convergence protocol (PDCP) layer, the radio link control (RLC) layer, and the radio resource control (RRC) layer.

The radio resource control section 1011 provided in the higher layer processing section 101 manages various configuration information of the device itself. For example, the radio resource control section 1011 manages an RNTI such as the C-RNTI. In addition, the radio resource control section 1011 generates information to be placed in respective uplink channels, and outputs the information to the transmission section 107.

The scheduling information interpretation section 1013 provided in the higher layer processing section 101 interprets information used for scheduling of physical channels (such as the PUSCH and PDSCH) received via the reception section 105, and on the basis of the results of interpreting the information, generates control information for controlling the reception section 105 and the transmission section 107, which is output to the control section 103.

The search space control section 1015 provided in the higher layer processing section 101 interprets the 1-bit information indicating the component carrier type received via the reception section 105. On the basis of the result of interpreting the information, the search space control section 1015 generates control information for controlling the monitoring for the PDCCH or E-PDCCH by the reception section 105, and outputs the control information to the control section 103. Also, the search space control section 1015 computes the control channel element numbers constituting the UE-specific search space on the basis of the RNTI. Also, on the basis of radio resource control information received via the reception section 105, the search space control section 1015 configures (identifies) the enhanced control channel elements constituting the UE-specific search space, virtual resource blocks, and physical resource blocks.

On the basis of the control information from the higher layer processing section 101, the control section 103 generates control signals that control the reception section 105 and the transmission section 107. The control section 103 outputs the generated control signals to the reception section 105 and the transmission section 107, and controls the reception section 105 and the transmission section 107.

The reception section 105, following a control signal input from the control section 103, demultiplexes, demodulates, and decodes a reception signal received from the base station device 3 via the transceiving antenna 109, and outputs the decoded information to the higher layer processing section 101.

The radio reception section 1057 downconverts a downlink signal received via the transceiving antenna 109 to an intermediate frequency, removes unwanted frequency components, controls the amplification level so that the signal level is suitably maintained, conducts orthogonal demodulation on the basis of the in-phase components and the orthogonal components of the received signal, and converts the orthogonally demodulated analog signal into a digital signal. The radio reception section 1057 removes a portion corresponding to a guard interval (GI) from the converted digital signal, applies the fast Fourier transform (FFT) to the signal with the guard interval removed, and extracts a signal in the frequency domain.

The multiplexing/demultiplexing section 1055 demultiplexes the extracted signal into the PHICH, PDCCH, E-PDCCH, PDSCH, and downlink reference signal. Also, the multiplexing/demultiplexing section 1055 compensates the channels of the PHICH, PDCCH, and PDSCH from estimated channel values input from the channel measurement section 1059. In addition, the multiplexing/demultiplexing section 1055 outputs the demultiplexed downlink reference signal to the channel measurement section 1059.

The demodulation section 1053 multiplies and combines corresponding signs with the PHICH, conducts demodulation according to a binary phase shift keying (BPSK) scheme on the combined signal, and outputs to the decoding section 1051. The decoding section 1051 decodes the PHICH addressed to the current device, and outputs the decoded HARQ indicator to the higher layer processing section 101. The demodulation section 1053 conducts demodulation according to a QPSK modulation scheme on the PDCCH and/or E-PDCCH, and outputs to the decoding section 1051. The decoding section 1051 attempts blind decoding of the PDCCH and/or E-PDCCH, and in the case of successful blind decoding, outputs the decoded downlink control information and the RNTI included in the downlink control information to the higher layer processing section 101.

The demodulation section 1053 conducts demodulation on the PDSCH according to a modulation scheme broadcast in the downlink assignment, such as quadrature phase shift keying (QPSK), 16-QAM (quadrature amplitude modulation), or 64-QAM, and outputs to the decoding section 1051. The decoding section 1051 conducts decoding on the basis of information related to the coding rate broadcast in the downlink control information, and outputs the decoded downlink data (transport blocks) to the higher layer processing section 101.

The channel measurement section 1059 measures the downlink path loss and channel state from the downlink reference signal input from the multiplexing/demultiplexing section 1055, and outputs the measured path loss and channel state to the higher layer processing section 101. In addition, the channel measurement section 1059 computes estimated downlink channel values from the downlink reference signal, and outputs to the multiplexing/demultiplexing section 1055.

The transmission section 107, following a control signal input from the control section 103, generates an uplink reference signal, encodes and modulates uplink data (transport blocks) input from the higher layer processing section 101, multiplexes the PUCCH, PUSCH, and generated uplink reference signal, and transmits the multiplexed signal to the base station device 3 via the transceiving antenna 109.

The encoding section 1071 encodes uplink control information input from the higher layer processing section 101 using convolutional codes, block codes, or the like. In addition, the encoding section 1071 conducts encoding using turbo codes on the basis of information used for scheduling of the PUSCH.

The modulation section 1073 modulates the encoded bits input from the encoding section 1071 according to a modulation scheme broadcast in the downlink control information or a modulation scheme predetermined for each channel, such as BPSK, QPSK, 16-QAM, or 64-QAM. On the basis of information used for scheduling of the PUSCH, the modulation section 1073 decides on the number of data sequences to spatially multiplex, maps the multiple uplink data to be transmitted in the same PUSCH by using MIMO SM onto multiple sequences, and precodes the sequences.

The uplink reference signal generation section 1079 generates a sequence computed according to predetermined rules, on the basis of information such as a physical layer cell identity (PCI; also referred to as a cell ID) for identifying the base station device 3, the bandwidth in which the uplink reference signal is placed, the cyclic shift reported in the uplink grant, and the values of parameters for generating a DMRS sequence. The multiplexing section 1075, following a control signal input from the control section 103, reorders the PUSCH modulation symbols in parallel and then applies the discrete Fourier transform (DFT). In addition, the multiplexing section 1075 multiplexes the PUCCH and PUSCH signals and the generated uplink reference signal for each transmit antenna port. In other words, the multiplexing section 1075 places the PUCCH and PUSCH signals and the generated uplink reference signal into resource elements for each transmit antenna port.

The radio transmission section 1077 applies the inverse fast Fourier transform (IFFT) to the multiplexed signal, conducts modulation according to the SC-FDMA scheme, adds a guard interval to the SC-FDMA modulated SC-FDMA symbols, generates a digital signal in the baseband, converts the digital signal in the baseband to an analog signal, generates in-phase components and orthogonal components of an intermediate frequency from the analog signal, removes excess frequency components from the intermediate frequency band, upconverts the signal of intermediate frequency to a signal of high frequency, removes excess frequency components, amplifies the signal power, outputs to the transceiving antenna 109, and transmits the signal.

Figure 17:
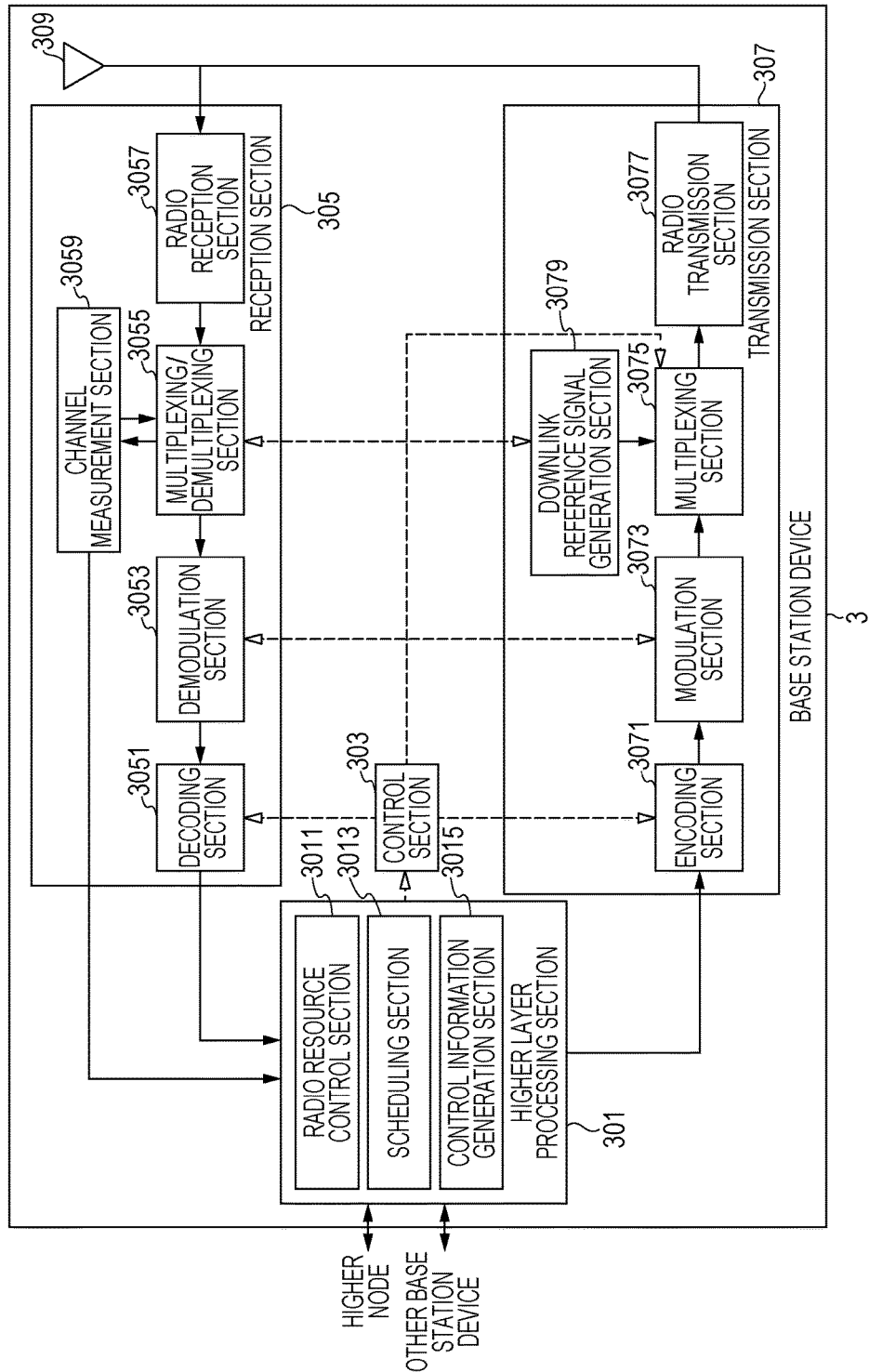
FIG. 17 is a schematic block diagram illustrating a configuration of a base station device according to the present embodiment.

FIG. 17 is a schematic block diagram illustrating a configuration of the base station device 3 according to the present embodiment. As illustrated in the drawing, the base station device 3 comprises a higher layer processing section 301, a control section 303, a reception section 305, a transmission section 307, and a transceiving antenna 309. In addition, the higher layer processing section 301 comprises a radio resource control section 3011, a scheduling section 3013, and a control information generation section 3015. In addition, the reception section 305 comprises a decoding section 3051, a demodulation section 3053, a multiplexing/demultiplexing section 3055, a radio reception section 3057, and a channel measurement section 3059. In addition, the transmission section 307 comprises an encoding section 3071, a modulation section 3073, a multiplexing section 3075, a radio transmission section 3077, and a downlink reference signal generation section 3079.

The higher layer processing section 301 conducts processing in the medium access control (MAC) layer, the packet data convergence protocol (PDCP) layer, the radio link control (RLC) layer, and the radio resource control (RRC) layer. In addition, the higher layer processing section 301 generates control information for controlling the reception section 305 and the transmission section 307, and outputs to the control section 303.

The radio resource control section 3011 provided in the higher layer processing section 301 generates, or acquires from a higher node, downlink data (transport blocks) to be placed in the downlink PDSCH, an RRC signal, and a MAC control element (CE), and outputs to the transmission section 307. In addition, the radio resource control section 3011 manages various configuration information for each mobile station device 1. For example, the radio resource control section 3011 conducts RNTI management, such as assigning a C-RNTI to the mobile station device 1.

The scheduling section 3013 provided in the higher layer processing section 301 decides on factors such as the frequencies and subframes to which to assign physical channels (the PDSCH and PUSCH), the coding rate and modulation scheme of the physical channels (the PDSCH and PUSCH), as well as the transmit power, from information such as estimated channel values and channel quality input from the channel measurement section 3059. On the basis of the scheduling results, the scheduling section 3013 generates control information for controlling the reception section 305 and the transmission section 307, and outputs to the control section 303. In addition, the scheduling section 3013 outputs scheduling results for the physical channels (the PDSCH and PUSCH) to the control information generation section 3015.

The control information generation section 3015 generates information used for scheduling of physical channels (the PDSCH and PUSCH) on the basis of scheduling results input from the scheduling section 3013. The control information generation section 3015 generates information such as a master information block that includes 1-bit information indicating the component carrier type, a system information block 2 that includes information indicating the enhanced UE-specific search space, and dedicated radio resource control information that indicates the enhanced UE-specific search space. In addition, the control information generation section 3015 outputs generated information to the transmission section 307.

On the basis of the control information from the higher layer processing section 301, the control section 303 generates control signals that control the reception section 305 and the transmission section 307. The control section 303 outputs the generated control signals to the reception section 305 and the transmission section 307, and controls the reception section 305 and the transmission section 307.

The reception section 305, following a control signal input from the control section 303, demultiplexes, demodulates, and decodes a reception signal received from the mobile station device 1 via the transceiving antenna 309, and outputs the decoded information to the higher layer processing section 301. The radio reception section 3057 downconverts an uplink signal received via the transceiving antenna 309 to an intermediate frequency, removes unwanted frequency components, controls the amplification level so that the signal level is suitably maintained, conducts orthogonal demodulation on the basis of the in-phase components and the orthogonal components of the received signal, and converts the orthogonally demodulated analog signal into a digital signal.

The radio reception section 3057 removes portions corresponding to a guard interval (GI) from the converted digital signal. The radio reception section 3057 applies the fast Fourier transform (FFT) to the signal with the guard interval removed, extracts a signal in the frequency domain, and outputs to the multiplexing/demultiplexing section 3055.

The multiplexing/demultiplexing section 1055 demultiplexes the signal input from the radio reception section 3057 into signals such as the PUCCH, the PUSCH, and the uplink reference signal. Note that this demultiplexing is conducted on the basis of radio resource allocation information included in an uplink grant decided by the radio resource control section 3011 of the base station device 3 in advance and reported to the mobile station device 1. Also, the multiplexing/demultiplexing section 3055 compensates the channel of the PUCCH and PUSCH from estimated channel values input from the channel measurement section 3059. In addition, the multiplexing/demultiplexing section 3055 outputs the demultiplexed uplink reference signal to the channel measurement section 3059.

The demodulation section 3053 applies the inverse discrete Fourier transform (IDFT) to the PUSCH, acquires modulation symbols, and for each modulation symbol in the PUCCH and PUSCH, demodulates the received signal using a modulation scheme that is predetermined or reported in advance by the current device to each mobile station device 1 in the uplink grant, such as binary phase shift keying (BPSK), QPSK, 16-QAM, or 64-QAM. The demodulation section 3053 separates the modulation symbols in multiple streams of uplink data transmitted on the same PUSCH by using MIMO SM, on the basis of the number of spatially multiplexed sequences reported in advance in the uplink grant to each mobile station device 1, and information giving instructions on precoding to be conducted on these sequences.

The decoding section 3051 decodes the encoded bits of the demodulated PUCCH and PUSCH according to a predetermined coding scheme at a coding rate that is predetermined or reported in advance by the current device to the mobile station device 1 in the uplink grant, and outputs the decoded uplink data and uplink control information to the higher layer processing section 101. In the case in which the PUSCH is retransmitted, the decoding section 3051 conducts decoding using encoded bits and demodulated encoded bits being held in a HARQ buffer input from the higher layer processing section 301. The channel measurement section 3059 measures factors such as estimated channel values and channel quality from the uplink reference signal input from the multiplexing/demultiplexing section 3055, and outputs to the multiplexing/demultiplexing section 3055 and the higher layer processing section 301.

The transmission section 307, following a control signal input from the control section 303, generates a downlink reference signal, encodes and modulates a HARQ indicator, downlink control information, and downlink data input from the higher layer processing section 301, multiplexes the PHICH, PDCCH, E-PDCCH, PDSCH, and downlink reference signal, and transmits a signal to the mobile station device 1 via the transceiving antenna 309.

The encoding section 3071 encodes a HARQ indicator, downlink control information, and downlink data input from the higher layer processing section 301 using a predetermined coding scheme, such as block codes, convolutional codes, or turbo codes, or alternatively, encodes using a coding scheme decided by the radio resource control section 3011. The modulation section 3073 modulates encoded bits input from the encoding section 3071 according to a modulation scheme that is predetermined or decided by the radio resource control section 3011, such as BPSK, QPSK, 16-QAM, or 64-QAM.

The downlink reference signal generation section 3079 generates, as a downlink reference signal, a sequence known to the mobile station device 1 and computed according to predetermined rules on the basis of information such as a physical layer cell identity (PCI) for identifying the base station device 3. The multiplexing section 3075 multiplexes the modulated modulation symbols of each channel and the generated downlink reference signal. In other words, the multiplexing section 3075 places the modulated modulation symbols of each channel and the generated downlink reference signal into resource elements.

The radio transmission section 3077 applies the inverse fast Fourier transform (IFFT) to the multiplexed modulation symbols and the like, conducts modulation according to the OFDM scheme, adds a guard interval to the OFDM modulated OFDM symbols, generates a digital signal in the baseband, converts the digital signal in the baseband to an analog signal, generates in-phase components and orthogonal components of an intermediate frequency from the analog signal, removes excess frequency components from the intermediate frequency band, upconverts the signal of intermediate frequency to a signal of high frequency, removes excess frequency components, amplifies the signal power, outputs to the transceiving antenna 309, and transmits the signal.

Other Embodiments (a) Namely, a base station device according to the present embodiment is a base station device that communicates with a mobile station device. The base station device uses a physical broadcast channel (PBCH) to transmit information instructing the mobile station device to monitor a common search space (CSS) or an enhanced common search space (E-CSS) for a physical downlink channel.

(b) Also, the base station device according to the present embodiment transmits the physical broadcast channel with 0th to 3rd OFDM symbols in a second slot of a 0th subframe in respective radio frames in the time domain, and with the central 72 downlink subcarriers of a cell in the frequency domain.

(c) Also, the base station device according to the present embodiment transmits a physical downlink control channel in the common search space, and transmits an enhanced physical downlink control channel in the enhanced common search space. Namely, the base station device according to the present embodiment places a physical downlink control channel in the common search space, and places an enhanced physical downlink control channel in the enhanced common search space.

(d) Also, in a case in which the physical downlink control channel is not placed in the cell used to communicate with the mobile station device, the base station device according to the present embodiment instructs the mobile station device to monitor the enhanced common search space for the enhanced physical downlink control channel with the information.

(e) Also, in a case in which the physical downlink control channel and the enhanced physical downlink control channel are placed in the cell used to communicate with the mobile station device, the base station device according to the present embodiment instructs the mobile station device to monitor the common search space for the physical downlink control channel with the information.

(f) Also, a base station device according to the present embodiment is a base station device that communicates with a mobile station device, and uses a physical downlink shared channel to transmit a system information block which is common for a plurality of the mobile station device and which includes information related to configuration of an enhanced mobile station device-specific search space.

(g) Also, the base station device according to the present embodiment uses the physical downlink shared channel to transmit dedicated radio resource control information for the mobile station device, including information related to configuration of the enhanced mobile station device-specific search space.

(h) Also, until transmitting the dedicated radio resource control information to the mobile station device, the base station device according to the present embodiment, on the basis of information related to configuration of the enhanced mobile station device-specific search space included in the system information block, transmits an enhanced physical downlink control channel targeting the mobile station device in the enhanced mobile station device-specific search space configured by the mobile station device.

(i) Also, a base station device according to the present embodiment is a base station device that communicates with a mobile station device, and places each of one or a plurality of pieces of downlink control information (enhanced downlink control channels) in one or a plurality of enhanced control channel elements. Also, the base station device places the enhanced control channel elements in a plurality of virtual resource blocks so that a plurality of the enhanced control elements are placed in a single virtual resource block. Also, the base station device places the virtual resource blocks with numbers that are consecutive in a first slot into physical resource blocks with numbers that are distributed in a first slot. Also, the base station device places the virtual resource blocks with numbers that are consecutive in a second slot into physical resource blocks with numbers that are distributed in a second slot. Also, the base station device places a virtual resource block in the first slot and a virtual resource block in the second slot with the same number into the physical resource blocks with numbers that are distributed.

(j) Also, the base station device according to the present embodiment interleaves a plurality of the enhanced control channel elements placed in a virtual resource block in the first slot and a virtual resource block in the second slot with the same number before placement in the physical resource blocks, in units that are smaller than the enhanced control channel elements.

(k) Also, a mobile station device according to the present embodiment is a mobile station device that communicates with a base station device. The mobile station device uses a physical broadcast channel to receive information instructing the mobile station device to monitor a common search space or an enhanced common search space for a physical downlink channel, and on the basis of the information, monitors the common search space or the enhanced common search space for the physical downlink channel.

(l) Also, in a mobile station device according to the present embodiment, the physical broadcast channel is transmitted with 0th to 3rd OFDM symbols in a second slot of a 0th subframe in respective radio frames in the time domain, and with the central 72 downlink subcarriers of a cell in the frequency domain.

(m) Also, the mobile station device according to the present embodiment receives a physical downlink control channel in the common search space, and receives an enhanced physical downlink control channel in the enhanced common search space. In the mobile station device according to the present embodiment, the physical downlink control channel is time-multiplexed with a physical downlink shared channel, and the enhanced physical downlink control channel is frequency-multiplexed with the physical downlink shared channel.

(n) Also, a mobile station device according to the present embodiment is a mobile station device that communicates with a base station device. The mobile station device uses a physical downlink shared channel to receive a system information block common for a plurality of the mobile station device. In the mobile station device according to the present embodiment, the system information block includes information related to configuration of an enhanced mobile station device-specific search space.

(o) Also, the mobile station device according to the present embodiment uses the physical downlink shared channel to receive dedicated radio resource control information for the mobile station device. In the mobile station device according to the present embodiment, the dedicated radio resource control information includes information related to configuration of the enhanced mobile station device-specific search space.

(p) Also, until receiving the dedicated radio resource control information from the base station device, the mobile station device according to the present embodiment monitors the enhanced mobile station device-specific search space configured on the basis of information related to configuration of the enhanced mobile station device-specific search space included in the system information block for an enhanced physical downlink control channel targeting the device itself.

(q) Also, in a case in which the enhanced mobile station device-specific search space is configured on the basis of information related to configuration of the enhanced mobile station device-specific search space included in the dedicated radio resource control information, the mobile station device according to the present embodiment does not configure the enhanced mobile station device-specific search space on the basis of information related to configuration of the enhanced mobile station device-specific search space included in a subsequently received system information block. In other words, in a case in which the enhanced mobile station device-specific search space is configured on the basis of information related to configuration of the enhanced mobile station device-specific search space included in the dedicated radio resource control information, the mobile station device according to the present embodiment does not apply information related to configuration of the enhanced mobile station device-specific search space included in a subsequently received system information block.

(q) Also, a mobile station device according to the present embodiment is a mobile station device that communicates with a base station device. The mobile station device receives one or a plurality of pieces of downlink control information (enhanced physical downlink control channels) from the base station device. In the mobile station device according to the present embodiment, each of one or a plurality of pieces of downlink control information (enhanced downlink control channels) is placed in one or a plurality of enhanced control channel elements. Also, the enhanced control channel elements are placed in a plurality of virtual resource blocks so that a plurality of the enhanced control elements are placed in a single virtual resource block. Also, the virtual resource blocks with numbers that are consecutive in a first slot are placed into physical resource blocks with numbers that are distributed in a first slot. Also, the virtual resource blocks with numbers that are consecutive in a second slot are placed into physical resource blocks with numbers that are distributed in a second slot. Also, a virtual resource block in the first slot and a virtual resource block in the second slot with the same number are placed into the physical resource blocks with numbers that are distributed.

(r) Also, in the mobile station device according to the present embodiment, a plurality of the enhanced control channel elements placed in a virtual resource block in a first slot and a virtual resource block in a second slot with the same number are interleaved before placement in the physical resource blocks, in units that are smaller than the control channel elements.

(s) Also, a wireless communication system according to the present embodiment is a wireless communication system in which a mobile station device and a base station device communicate. The base station device uses a physical broadcast channel to transmit information instructing the mobile station device to monitor a common search space or an enhanced common search space for a physical downlink channel. Also, on the basis of the information, the mobile station device monitors the common search space or the enhanced common search space for the physical downlink channel.

(t) Also, a wireless communication system according to the present embodiment is a wireless communication system in which a mobile station device and a base station device communicate. The base station device uses a physical downlink shared channel to transmit a system information block common for a plurality of the mobile station device and including information related to configuration of an enhanced mobile station device-specific search space. Also, the mobile station device configures the enhanced mobile station device-specific search space on the basis of the information.

(u) Also, a wireless communication system according to the present embodiment is a wireless communication system in which a mobile station device and a base station device communicate. The base station device places downlink control information in one or a plurality of contiguous enhanced control channel elements. Also, the base station device places the enhanced control channel elements in a plurality of virtual resource blocks so that a plurality of the enhanced control elements are placed in a single virtual resource block. Also, the base station device places the virtual resource blocks with numbers that are consecutive in a first slot into physical resource blocks with numbers that are distributed in a first slot. Also, the base station device places the virtual resource blocks with numbers that are consecutive in a second slot into physical resource blocks with numbers that are distributed in a second slot. Also, the base station device places a virtual resource block in the first slot and a virtual resource block in the second slot with the same number into the physical resource blocks with numbers that are distributed. Also, the base station device transmits a signal placed in the physical resource blocks to the mobile station device. Also, the mobile station device receives the signal placed in the physical resource blocks, and conducts a process of decoding the downlink control information on the received signal.

A program operating on a base station device 3 and a mobile station device 1 according to the present embodiment may be a program that controls a central processing unit (CPU) or the like (a program that causes a computer to function) so as to realize the functions of the above embodiment in accordance with the present invention. Additionally, information handled by these devices is temporarily accumulated in random access memory (RAM) during the processing thereof, and thereafter stored in various types of read-only memory (ROM) such as flash ROM or on a hard disk drive (HDD), and then read out and modified/written by the CPU as necessary.

Note that parts of the mobile station device 1 and the base station device 3 in the embodiment discussed above may also be realized with a computer. In this case, a program for realizing the control functions may be recorded to a computer-readable recording medium, and the devices may be realized by causing a computer system to read and execute the program recorded on the recording medium.

Note that the "computer system" referred to herein is a computer system built into the mobile station device 1 or the base station device 3, and is assumed to include an OS and hardware such as peripheral devices. In addition, the "computer-readable recording medium" refers to a portable medium such as a flexible disk, a magneto-optical disc, ROM, or a CD-ROM, or a storage device such as a hard disk built into the computer system.

Furthermore, the term "computer-readable recording medium" may also encompass media that briefly or dynamically retain the program, such as a communication line in the case of transmitting the program via a network such as the Internet or a communication channel such as a telephone line, as well as media that retain the program for a given period of time, such as volatile memory inside the computer system acting as the server or client in the above case. Moreover, the above program may be a program for realizing part of the functions discussed earlier, but may also be able to realize the functions discussed earlier in combination with programs already recorded onto the computer system.

In addition, all or part of the mobile station device 1 and the base station device 3 in the foregoing embodiment may also be realized as LSI, which is typically an integrated circuit, or be realized as a chipset. The various function blocks of the mobile station device 1 and the base station device 3 may be realized as individual chips, or all or part thereof may be integrated as a single chip. Furthermore, the circuit integration methodology is not limited to LSI and may be also be realized with special-purpose circuits, or with general-purpose processors. In addition, if progress in semiconductor technology yields integrated circuit technology that may substitute for LSI, the use of an integrated circuit according to that technology is also possible.

The foregoing thus describes an embodiment of the present invention in detail and with reference to the drawings. However, specific configurations are not limited to the foregoing, and various design modifications and the like are possible within a scope that does not depart from the principal matter of the present invention.

REFERENCE SIGNS LIST

1 (1A, 1B, 1C) mobile station device
3 base station device
101, 301 higher layer processing section
103, 303 control section
105, 305 reception section
107, 307 transmission section
109, 309 transceiving antenna
1011, 3011 radio resource control section
1013 scheduling information interpretation section
1015 search space control section
1051, 3051 decoding section
1053, 3053 demodulation section
1055, 3055 multiplexing/demultiplexing section
1057, 3057 radio reception section
1059, 3059 channel measurement section
1071, 3071 encoding section
1073, 3073 modulation section
1075, 3075 multiplexing section
1077, 3077 radio transmission section
1079 uplink reference signal generation section
3013 scheduling section
3015 control information generation section
3079 downlink reference signal generation section

The invention claimed is:

1. A mobile station device comprising:
reception circuitry configured to and/or programmed to receive first system information indicating a carrier type; and
decoding circuitry configured to and/or programmed to monitor a common search space for a control channel, wherein
OFDM symbols for the control channel are given by the first system information indicating the carrier type,
in a case that the first system information indicating the carrier type is set to a first value, positions of the OFDM symbols for the control channel are predefined positions in a subframe, and
in a case that the first system information indicating the carrier type is set to a second value, the positions of the OFDM symbols for the control channel are given by received second information.

2. The mobile station device according to claim 1:
the first system information indicates either one of a first carrier type and a second carrier type, and
a set of first signals is transmitted in a first downlink carrier of the first carrier type and not transmitted in a second downlink carrier of the second carrier type.

3. A base station device comprising:
transmission circuitry configured to and/or programmed to transmit first system information indicating a carrier type; and
encoding circuitry configured to and/or programmed to encode a control channel, wherein
the transmission circuitry is configured to and/or programmed to transmit the control channel on a common search space,
OFDM symbols for the control channel are given by the first system information indicating the carrier type,
in a case that the first system information indicating the carrier type is set to a first value, positions of the OFDM symbols for the control channel are predefined positions in a subframe, and
in a case that the first system information indicating the carrier type is set to a second value, the positions of the OFDM symbols for the control channel are given by received second information.

4. The base station device according to claim 3:
the first system information indicates either one of a first carrier type and a second carrier type, and
a set of first signals is transmitted in a first downlink carrier of the first carrier type and not transmitted in a second downlink carrier of the second carrier type.

5. A communication method used for a mobile station device comprising:
receiving a first system information indicating a carrier type;
determining OFDM symbols for a control channel based on the first system information indicating the carrier type; and monitoring a common search space for a control channel, wherein in a case that the first system information indicating the carrier type is set to a first value, positions of the OFDM symbols for the control channel are predefined positions in a subframe, in a case that the first system information indicating the carrier type is set to a second value, the positions of the OFDM symbols for the control channel are given by received second information, the receiving step uses reception circuitry configured to and/or programmed to receive the first system information indicating the carrier type, and the determining step uses decoding circuitry configured to and/or programmed to monitor the common search space for the control channel.

6. A communication method used for a base station device comprising:

transmitting a first system information indicating a carrier type, determining OFDM symbols for a control channel based on the first system information indicating the carrier type, encoding the control channel, and transmitting the control channel on a common search space, wherein in a case that the first system information indicating the carrier type is set to a first value, positions of the OFDM symbols for the control channel are predefined positions in a subframe, in a case that the first system information indicating the carrier type is set to a second value, the positions of the OFDM symbols for the control channel are given by received second information, the transmitting the first system information indicating the carrier type step uses transmission circuitry, and the determining step uses decoding circuitry configured to and/or programmed to monitor the common search space for the control channel.

* * * * *